US012584544B2

(12) United States Patent
Segawa

(10) Patent No.: US 12,584,544 B2
(45) Date of Patent: Mar. 24, 2026

(54) BALL SCREW DEVICE

(71) Applicant: NSK LTD., Tokyo (JP)

(72) Inventor: Ryo Segawa, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/726,293

(22) PCT Filed: Dec. 6, 2022

(86) PCT No.: PCT/JP2022/044845
§ 371 (c)(1),
(2) Date: Jul. 3, 2024

(87) PCT Pub. No.: WO2023/132172
PCT Pub. Date: Jul. 13, 2023

(65) Prior Publication Data
US 2025/0075778 A1     Mar. 6, 2025

(30) Foreign Application Priority Data

Jan. 5, 2022    (JP) ................................. 2022-000587

(51) Int. Cl.
F16H 25/24        (2006.01)
F16C 33/58        (2006.01)
F16H 25/22        (2006.01)
(52) U.S. Cl.
CPC ........... F16H 25/24 (2013.01); F16C 33/581 (2013.01); F16H 25/2223 (2013.01)
(58) Field of Classification Search
CPC ...... F16H 25/20; F16H 25/22; F16H 25/2204; F16H 25/24
See application file for complete search history.

(56) References Cited

U.S. PATENT DOCUMENTS

| | | | | |
|---|---|---|---|---|
| 8,495,924 B2 * | 7/2013 | Fukano | ............... | F16H 25/2454 |
| | | | | 74/89.44 |
| 11,136,016 B2 * | 10/2021 | Weh | ......................... | F04B 9/02 |
| 2009/0260463 A1 | 10/2009 | Fukano et al. | | |
| 2018/0345934 A1 | 12/2018 | Weh et al. | | |
| 2019/0010746 A1 * | 1/2019 | Sakiyama | ............... | E05F 15/63 |
| 2024/0271683 A1 * | 8/2024 | Mori | ................... | F16H 25/2252 |

FOREIGN PATENT DOCUMENTS

| | | | | |
|---|---|---|---|---|
| JP | 2009-275914 A | | 11/2009 | |
| JP | 2009-286137 A | | 12/2009 | |
| JP | 2011133073 A | * | 7/2011 | |
| JP | 2016-148374 A | | 8/2016 | |
| JP | 2018-194080 A | | 12/2018 | |

OTHER PUBLICATIONS

Machine translation of JP-2011133073-A. (Year: 2011).*
International Search Report of PCT/JP2022/044845 dated Feb. 21, 2023 [PCT/ISA/210].

* cited by examiner

*Primary Examiner* — Randell J Krug
(74) *Attorney, Agent, or Firm* — Sughrue Mion, PLLC

(57)        ABSTRACT

A ball screw device having a screw shaft, a nut, a plurality of balls, a carrier constituting a planetary reduction mechanism, a rolling bearing for rotatably supporting the carrier, where the screw shaft includes a screw portion having a spiral-shaped shaft-side ball screw groove on an outer circumferential surface thereof, and a fitting shaft portion, the carrier is fixed to the fitting shaft portion such that relative rotation is not possible, an inner ring raceway of the rolling bearing is formed directly on an outer circumferential surface of the carrier.

4 Claims, 15 Drawing Sheets

ONE SIDE IN THE AXIAL DIRECTION

OTHER SIDE IN THE AXIAL DIRECTION

ONE SIDE IN THE AXIAL DIRECTION

OTHER SIDE IN THE AXIAL DIRECTION

ONE SIDE IN THE
AXIAL DIRECTION

OTHER SIDE IN THE
AXIAL DIRECTION

ONE SIDE IN THE
AXIAL DIRECTION

OTHER SIDE IN THE
AXIAL DIRECTION

ONE SIDE IN THE AXIAL DIRECTION

OTHER SIDE IN THE AXIAL DIRECTION

ONE SIDE IN THE AXIAL DIRECTION

OTHER SIDE IN THE AXIAL DIRECTION

BALL SCREW DEVICE

CROSS REFERENCE TO RELATED APPLICATIONS

This application is a National Stage of International Application No. PCT/JP2022/044845 filed on Dec. 6, 2022, claiming priority based on Japanese Patent Application No. 2022-000587 filed on Jan. 5, 2022.

TECHNICAL FIELD

The present disclosure relates to a ball screw device.

BACKGROUND ART

The ball screw device causes balls to roll and move between a screw shaft and a nut, and thus higher efficiency may be obtained compared to a sliding screw device that brings the screw shaft and nut into direct contact. Therefore, ball screw devices are incorporated in various mechanical devices, such as electric brake devices and automatic manual transmissions (AMT) of automobiles, and positioning devices of machine tools, in order to convert a rotational motion of a drive source such as an electric motor into linear motion.

A ball screw device includes a screw shaft having a spiral-shaped shaft-side ball screw groove on an outer circumferential surface thereof, a nut having a spiral-shaped nut-side ball screw groove on an inner circumferential surface thereof, and a plurality of balls arranged between the shaft-side ball screw groove and the nut-side ball screw groove. In a ball screw device, one of the screw shaft and the nut is used as a rotational motion element, and the other of the screw shaft and the nut is used as a linear motion element, depending on the application.

FIG. 14 illustrates a ball screw device 100 with a known structure, which is described in JP 2009-286137 A.

The ball screw device 100 includes a screw shaft 101, a nut 102, and a plurality of balls (not illustrated).

The screw shaft 101 has a screw portion 103 and a fitting shaft portion 104 that is arranged adjacent to one side in the axial direction of the screw portion 103. A spiral-shaped shaft-side ball screw groove 105 is formed on an outer circumferential surface of the screw portion 103. The fitting shaft portion 104 has a smaller outer diameter than the screw portion 103. The screw shaft 101 is arranged coaxially with the nut 102 in a state in which the screw portion 103 is inserted through the nut 102.

The nut 102 has a cylindrical shape. A spiral-shaped nut-side ball screw groove (not illustrated) is formed on an inner circumferential surface of the nut 102. The nut 102 engages with a plurality of guide rods 107 supported by a housing 106. This makes it possible to prevent the nut 102 from rotating.

The shaft-side ball screw groove 105 and the nut-side ball screw groove are arranged so as to face each other in the radial direction, and form a spiral-shaped load path. The starting point and ending point of the load path are connected by a circulation means (not illustrated). Therefore, the balls that have reached the end point of the load path are returned to the start point of the load path through the circulation means. Note that the starting point and the ending point of the load path are switched depending on a direction of relative displacement in the axial direction between the screw shaft 101 and the nut 102, that is, the relative rotation direction between the screw shaft 101 and the nut 102.

In the ball screw device 100, rotation of an electric motor 108, which is a drive source, is transmitted to the screw shaft 101 at a reduced speed by a pulley device 109. For this purpose, a driven pulley 110 is externally fitted onto the fitting shaft portion 104 provided at an end portion on the one side in the axial direction of the screw shaft 101 such that relative rotation is not possible.

In addition, a drive pulley 112 is externally fitted onto the tip-end portion of a motor shaft 111 of the electric motor 108 such that relative rotation is not possible. A belt 113 is stretched between the drive pulley 112 and the driven pulley 110. Thus, the rotation of the electric motor 108 is decelerated and transmitted to the screw shaft 101.

CITATION LIST

Patent Literature

Patent Literature 1: JP 2009-286137 A

SUMMARY OF INVENTION

Technical Problem

In order to transmit the rotation of the electric motor to the screw shaft of the ball screw device, using a pulley device as in a known construction described in JP 2009-286137 A, or using a spur gear type reduction mechanism is considered to be possible.

The inventors of the present invention considered transmitting the rotation of an electric motor to a screw shaft of a ball screw device by using a planetary reduction mechanism that, when compared to a pulley device and a spur gear type reduction mechanism, offers advantages such as being able to arrange the input and output shafts coaxially and making the device more compact. FIG. 15 shows an undisclosed ball screw device that the present inventors considered before completing the ball screw device according to the present disclosure.

In this ball screw device, a carrier 115 of a planetary reduction mechanism 114 is externally fitted onto an end portion on one side in the axial direction of a screw shaft 101a of the ball screw device 100a such that relative rotation is not possible. More specifically, a fitting shaft portion 104a formed at the end portion on the one side in the axial direction of the screw shaft 101a is spline-fitted into a mounting hole 116 formed in a center portion in the radial direction of the carrier 115.

Moreover, a plurality of planetary gears 117 are rotatably supported with respect to the carrier 115. More specifically, pinion pins 119 are inserted through and supported by a plurality of support holes 118 formed in an intermediate portion in the radial direction of the carrier 115, and the planetary gears 117 are rotatably supported around the pinion pins 119. In addition, the plurality of planetary gears 117 are arranged between a sun gear 120 fixed to a tip-end portion of a motor shaft 111a of the electric motor 108a and a ring gear 121 arranged coaxially with the sun gear 120 and fixed to a housing 124. The plurality of planetary gears 117 mesh with the sun gear 120 and the ring gear 121.

In this ball screw device, when the electric motor 108a is energized and the sun gear 120 is rotated, the planetary gears 117 revolve around the sun gear 120 while rotating. The revolution motion of the planetary gears 117 is transmitted to the screw shaft 101a through the carrier 115, and rotationally drives the screw shaft 101a.

Moreover, the carrier 115 fixed to the fitting shaft portion 104a of the screw shaft 101a is rotatably supported with respect to the housing 124 using a rolling bearing 122. Therefore, the axial force transmitted to the carrier 115 is supported by the housing 124 through the rolling bearing 122.

With this construction, when the screw shaft 101a is rotationally driven, a reaction force in the axial direction that acts on the screw shaft 101a from the nut 102a through the balls can be prevented from being transmitted to an engagement section between the planetary gears 117 and the sun gear 120 and an engagement section between the planetary gears 117 and the ring gear 121. In addition, even in a case where a force in the axial direction acts on the carrier 115 due to the use of a helical gear as the planetary gear 117 for reasons such as ensuring sound vibration performance, the rolling bearing 122 is provided, and thus it is possible to prevent such axial force from being transmitted to rolling contact sections between the balls and the shaft-side ball screw groove 105a and the nut-side ball screw groove 125.

In this ball screw device, in order to efficiently transmit a force in the axial direction from the carrier 115 to the rolling bearing 122, an outward flange-shaped collar portion 123 is provided on a part of the outer circumferential surface of the carrier 115, and the flange-shaped collar portion 123 is brought into contact with the rolling bearing 122.

In this ball screw device, the carrier 115 is rotatably supported by the housing 124 using the rolling bearing 122 that is separate from the carrier 115, and thus as the number of parts increases, the ease of assembling the ball screw device 100a tends to deteriorate.

An object of the technique according to the present disclosure is to provide a ball screw device capable of reducing the number of parts and improving ease of assembly even in a case where construction is adopted in which the screw shaft is rotationally driven using a planetary reduction mechanism.

Solution to Problem

A ball screw device according to one aspect of the present disclosure includes a screw shaft, a nut, a plurality of balls, a carrier, and a rolling bearing.

The screw shaft includes a screw portion having a spiral-shaped shaft-side ball screw groove on an outer circumferential surface thereof, and a fitting shaft portion arranged on one side in an axial direction of the screw portion, and is configured to rotate when in use.

The nut includes a spiral-shaped nut-side ball screw groove on an inner circumferential surface and configured to move linearly when in use.

The plurality of balls are arranged between the shaft-side ball screw groove and the nut-side ball screw groove.

The carrier constitutes a planetary reduction mechanism, is fixed in a relatively unrotatable manner to the fitting shaft portion, and configured to rotationally drive the screw shaft.

The rolling bearing has an outer ring with an outer ring raceway on an inner circumferential surface thereof, an inner ring raceway provided in a portion facing the outer ring raceway in a radial direction, and a plurality of rolling elements rotatably arranged between the outer ring raceway and the inner ring raceway, and is configured to rotatably support the carrier.

The fitting shaft portion has an inner diameter side engaging portion on an outer circumferential surface thereof.

The carrier has a mounting hole in a center portion in the radial direction into which the fitting shaft portion can be inserted, and the mounting hole has an outer diameter side engaging portion on an inner circumferential surface thereof that engages with the inner diameter side engaging portion such that relative rotation is not possible.

In the ball screw device according to an aspect of the present disclosure, the inner ring raceway is directly formed on an outer circumferential surface of the carrier. That is, it can also be said that the inner ring that constitutes the rolling bearing and has the inner raceway is integrally formed with the carrier.

In the ball screw device according to an aspect of the present disclosure, the fitting shaft portion may have an inner diameter side fitting surface portion on a portion of the outer circumferential surface that is separated in the axial direction from the inner diameter side engaging portion, and the mounting hole may have an outer diameter side fitting surface portion on a portion of an inner circumferential surface thereof that is separated in the axial direction from the outer diameter side engaging portion, and the outer diameter side fitting surface portion fits with the inner diameter side fitting surface portion with a spigot fit.

In the ball screw device according to an aspect of the present disclosure, the inner diameter side fitting surface portion may be press-fitted into the outer diameter side fitting surface portion.

Alternatively, the inner diameter side fitting surface portion and the outer diameter side fitting surface portion may be fitted with a clearance fit with a minute gap.

In a case where the inner diameter side fitting surface portion and the outer diameter side fitting surface portion are fitted with a clearance fit with a minute gap, a locking ring, for example, is locked to the outer circumferential surface of the fitting shaft portion or the inner circumferential surface of the mounting hole, and the locking ring is able to prevent the fitting shaft portion from coming out of the mounting hole in the axial direction. Alternatively, a crimped portion is formed on the outer circumferential surface of the fitting shaft portion, and the crimped portion is able to prevent the fitting shaft portion from coming out of the mounting hole in the axial direction.

In the ball screw device according to an aspect of the present disclosure, the carrier may have a symmetrical shape with respect to the axial direction.

In the ball screw device according to an aspect of the present disclosure, an engagement section between the inner diameter side engaging portion and the outer diameter side engaging portion has an interference with regard to the radial direction in a portion in the axial direction.

In the ball screw device according to an aspect of the present disclosure, the carrier has support holes at a plurality of locations in the circumferential direction of an intermediate portion in the radial direction for inserting and supporting pinion pins of the planetary reduction mechanism.

In this case, the support holes may be through holes that pass through the carrier in the axial direction.

In the ball screw device according to an aspect of the present disclosure, the carrier may have a protruding portion extending toward the one side in the axial direction in a portion including openings of the support holes on the one side in the axial direction.

In this case, the protruding portion may have an annular shape.

Effect of Invention

In the ball screw device according to an aspect of the present disclosure, construction is employed in which the screw shaft is rotationally driven through a planetary reduction mechanism, making it possible to reduce the number of parts and improve the ease of assembly.

MODE FOR CARRYING OUT THE INVENTION

First Example

Figure 1:
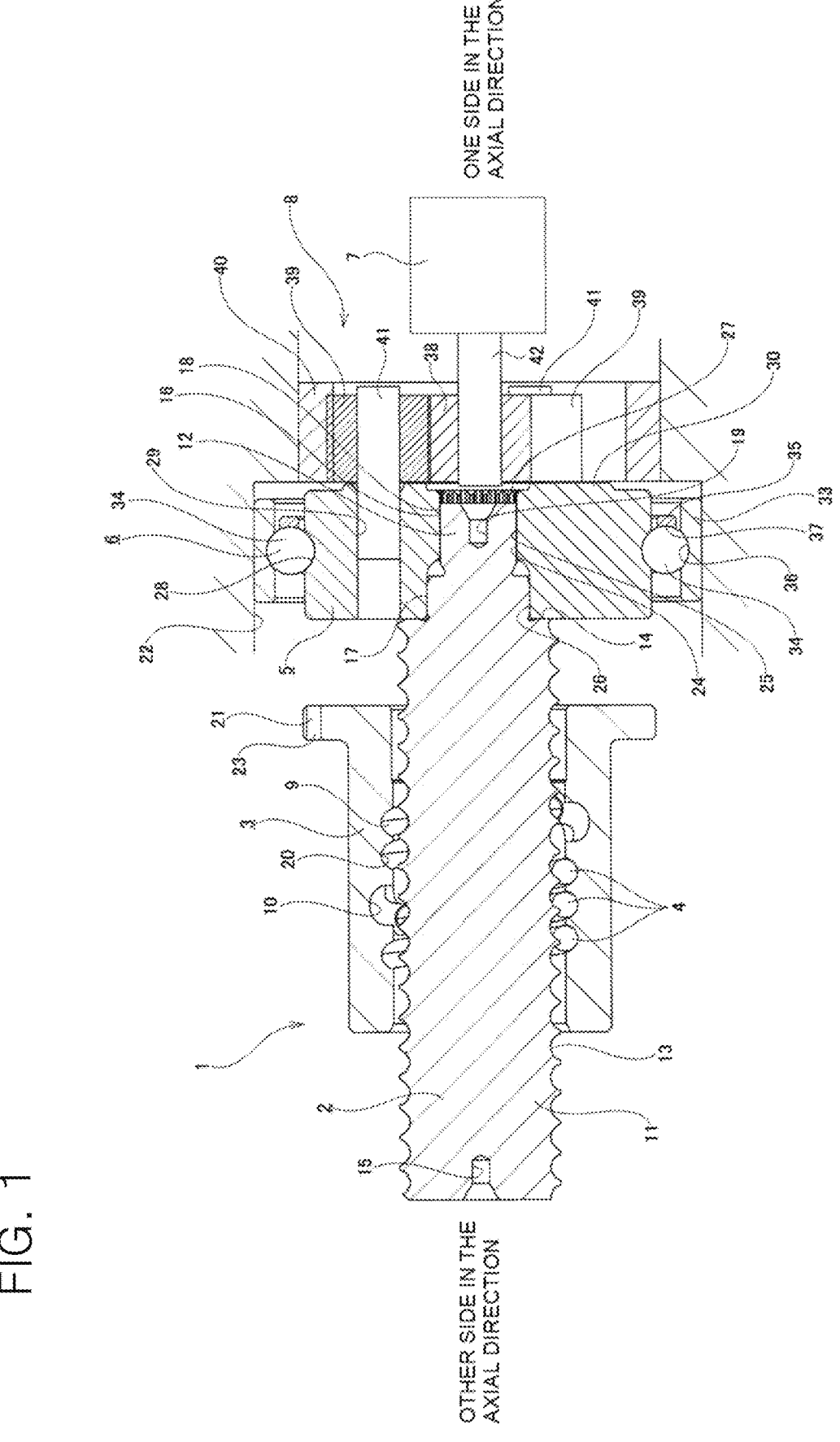
FIG. 1 is a cross-sectional view illustrating an example of construction in which a ball screw device of a first example of an embodiment according to the present disclosure and a planetary reduction mechanism are combined.
Figure 2:
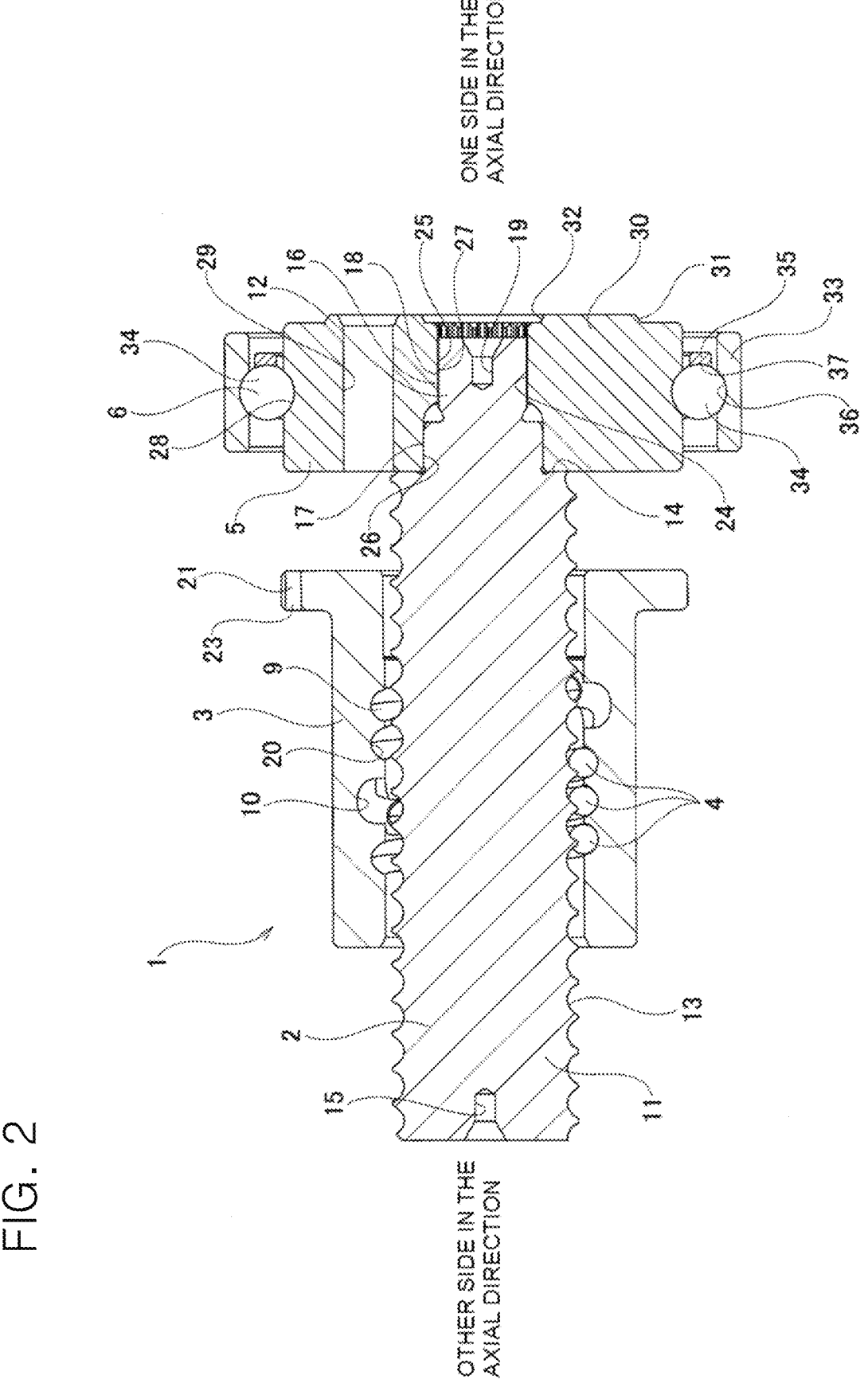
FIG. 2 is a cross-sectional view illustrating a ball screw device of the first example.

FIGS. 1 and 2 illustrate an example of construction in which a ball screw device of a first example of an embodiment according to the present disclosure and a planetary reduction mechanism are combined.

Overall Configuration of Ball Screw Device

A ball screw device 1 of the present example is incorporated into, for example, an electric brake booster device, and is used for converting the rotational motion of an electric motor, which is a drive source, into linear motion, and operating a piston of a hydraulic cylinder.

The ball screw device 1 includes a screw shaft 2, a nut 3, a plurality of balls 4, a carrier 5, and a rolling bearing 6.

The screw shaft 2 is a rotational motion element that is rotationally driven by an electric motor 7 as a drive source through a planetary reduction mechanism 8 and rotates during use. The screw shaft 2 is inserted through the inside of the nut 3 and is arranged coaxially with the nut 3. The nut 3 is prevented from rotating with respect to the screw shaft 2 by a rotation prevention mechanism (not illustrated), and is a linear motion element that moves linearly during use. That is, the ball screw device 1 of the present example is used in such a manner that the screw shaft 2 is rotationally driven and the nut 3 is moved linearly.

A spiral-shaped load path 9 is provided between the outer circumferential surface of the screw shaft 2 and the inner circumferential surface of the nut 3. A plurality of balls 4 are arranged in the load path 9 so as to be able to roll. When the screw shaft 2 and the nut 3 are rotated relative to each other, the balls 4 that have reached the end point of the load path 9 are returned to the starting point of the load path 9 through a circulation groove 10 formed on the inner circumferential surface of the nut 3.

Next, the construction of each component of the ball screw device 1 will be explained. In the present description, the axial direction, radial direction, and circumferential direction refer to the axial direction, radial direction, and circumferential direction with respect to the screw shaft 2, unless otherwise specified. Further, one side in the axial direction refers to the right side in FIGS. 1 and 2, and the other side in the axial direction refers to the left side in FIGS. 1 and 2.

Screw Shaft

The screw shaft 2 is made of metal and includes a screw portion 11 and a fitting shaft portion 12 adjacent to the screw portion 11 on the one side in the axial direction. The screw portion 11 and the fitting shaft portion 12 are arranged coaxially and are integrally formed. The fitting shaft portion 12 has a smaller outer diameter than the screw portion 11.

The screw portion 11 has a spiral-shaped shaft-side ball screw groove 13 on an outer circumferential surface thereof. The shaft-side ball screw groove 13 is formed by grinding, cutting, or rolling the outer circumferential surface of the screw portion 11. In the present example, the number of shaft-side ball screw grooves 13 is one. The cross-sectional groove shape (groove bottom shape) of the shaft-side ball screw groove 13 has a Gothic arch shape or a circular arc shape. The screw portion 11 has a ring-shaped abutment surface 14 on an end surface on the one side in the axial direction. The abutment surface 14 is a flat surface that exists on a virtual plane orthogonal to the central axis of the screw shaft 2. The screw portion 11 has a bottomed first center hole 15 in a center portion in the radial direction of an end surface on the other side in the axial direction.

The fitting shaft portion 12 has an inner diameter side engaging portion 16 at a portion on the one side in the axial direction (tip-end side portion) of the outer circumferential surface, and has an inner diameter side fitting surface portion 17 at a portion on the other side in the axial direction (base end side portion), which is a portion of the outer circumferential surface that is separated in the axial direction from the inner diameter side engaging portion 16. In the present example, a dimension in the axial direction of the inner diameter side engaging portion 16 is larger than a dimension in the axial direction of the inner diameter side fitting surface portion 17.

The inner diameter side engaging portion 16 has male spline teeth 18 over the entire circumference. That is, in the present example, the inner diameter side engaging portion 16 constitutes a male spline portion. In the present example, the male spline teeth 18 are configured by involute spline teeth; however, the male spline teeth may also be configured by square spline teeth.

The inner diameter side fitting surface portion 17 has a cylindrical outer circumferential surface, an outer diameter of which does not change in the axial direction. The outer diameter of the inner diameter side fitting surface portion 17 is larger than the tip circle diameter of the male spline teeth 18 of the inner diameter side engaging portion 16 and smaller than the outer diameter of the screw portion 11.

The fitting shaft portion 12 has a bottomed second center hole 19 in a center portion in the radial direction in an end surface on the one side in the axial direction. The second center hole 19 and the first center hole 15 provided in the screw portion 11 are arranged coaxially with each other. In addition, the bottom portion (inner end portion) of the second center hole 19 is located at an intermediate portion in the axial direction of the fitting shaft portion 12, and at an inner side in the radial direction of the inner diameter side engaging portion 16.

The screw shaft 2 is arranged coaxially with the nut 3 in a state in which the screw portion 11 is inserted through the inner side of the nut 3. In the present example, the screw shaft 2 is configured by the screw portion 11 and the fitting shaft portion 12; however, the screw shaft may also include a support shaft portion (second fitting shaft portion) for externally fitting and fixing other members.

Nut

The nut 3 is made of metal and has a cylindrical shape as a whole. The nut 3 has a spiral nut-side ball screw groove 20 and a circulation groove 10 on an inner circumferential surface thereof.

The nut-side ball screw groove 20 has a spiral shape and is formed by grinding, cutting, rolling tapping, or cutting tapping on the inner circumferential surface of the nut 3, for example. The nut-side ball screw groove 20 has the same lead as the shaft-side ball screw groove 13. Therefore, in a state in which the screw portion 11 of the screw shaft 2 is inserted through the inner side of the nut 3, the shaft-side ball screw groove 13 and the nut-side ball screw groove 20 are arranged to face each other in the radial direction, and a spiral-shaped load path 9 is formed. The number of nut-side ball screw grooves 20 is one, similar to the shaft-side ball screw groove 13. Similar to the shaft-side ball screw groove 13, the cross-sectional groove shape of the nut-side ball screw groove 20 is also a Gothic arch shape or a circular arc shape.

The circulation groove 10 has a substantially S-shape and is formed on the inner circumferential surface of the nut 3 by forging, such as cold forging. The circulation groove 10 smoothly connects portions adjacent in the axial direction of the nut-side ball screw groove 20 and connects the starting point and the ending point of the load path 9. Therefore, the balls 4 that have reached the end point of the load path 9 are returned to the starting point of the load path 9 through the circulation groove 10. Note that the starting point and the ending point of the load path 9 are switched depending on a direction of relative displacement in the axial direction of the screw shaft 2 and the nut 3 (the direction of relative rotation between the screw shaft 2 and the nut 3).

The circulation groove 10 has a substantially semicircular cross-sectional shape. The circulation groove 10 has a groove width slightly larger than the diameter of the balls 4, and has a groove depth that allows the balls 4 moving in the circulation groove 10 to get over the screw thread of the shaft-side ball screw groove 13.

The nut 3 has an outward-facing flange-shaped collar portion 21 at an end portion on the one side in the axial direction of the outer circumferential surface. The collar portion 21, at a plurality of locations (three locations in this example) in the circumferential direction, includes engaging grooves 23 that engage with a rotation prevention member (not illustrated) provided on a fixed member such as the housing 22 to prevent the nut 3 from rotating. Note that various conventionally known types of construction may be employed as the nut rotation prevention mechanism. For example, construction may be adopted in which a protruding portion (key) provided on the inner circumferential surface of a fixing member such as a housing is engaged with a concave groove formed in the axial direction on the outer circumferential surface of the nut.

In addition, a small diameter portion having an outer diameter that is smaller than a portion adjacent on the one side in the axial direction may be formed at an end portion on the other side in the axial direction of the outer circumferential surface of the nut 3. In this case, for example, a fitting cylinder such as a piston (not illustrated) can be externally fitted and fixed to the small diameter portion.

Balls

Balls 4 are respectively a steel ball having a predetermined diameter, and are arranged in the load path 9 and the circulation groove 10 so as to be able to roll. The balls 4 placed in the load path 9 roll while being subjected to a compressive load, whereas the balls 4 placed in the circulation groove 10 are pushed by the following balls 4 and roll and move without being subjected to a compressive load.

Carrier

The carrier 5 constitutes the planetary reduction mechanism 8, and rotates and drives the screw shaft 2 by transmitting torque input from the electric motor 7, which is a drive source, to the screw shaft 2.

The carrier 5 has a circular flat plate shape, and has a mounting hole 24 that penetrates in the axial direction at a center portion in the radial direction. The mounting hole 24 has an outer diameter side engaging portion 25 at a portion on the one side in the axial direction of the inner circumferential surface, and has an outer diameter side fitting surface portion 26 at a portion on the other side in the direction of the inner circumferential surface that is separated in the axial direction from the outer diameter side engaging portion 25.

The outer diameter side engaging portion 25 has female spline teeth 27 over the entire circumference. That is, in the present example, the outer diameter side engaging portion 25 constitutes a female spline portion. In the present example, the female spline teeth 27 are configured by involute spline teeth; however, the female spline teeth may also be configured by square spline teeth.

The outer diameter side fitting surface portion 26 has a cylindrical outer circumferential surface, an inner diameter of which does not change in the axial direction. The inner diameter of the outer diameter side fitting surface portion 26 is larger than the root diameter of the female spline teeth 27 of the outer diameter side engaging portion 25, and is slightly smaller than the outer diameter of the inner diameter side fitting surface portion 17.

The carrier 5 is externally fixed to the fitting shaft portion 12 by inserting the fitting shaft portion 12 of the screw shaft 2 inside the mounting hole 24. In addition, by abutting the abutting surface 14 provided on the screw portion 11 of the screw shaft 2 against the side surface on the other side in the axial direction of the carrier 5, the screw shaft 2 and the carrier 5 may be positioned in the axial direction.

In the present example, by inserting the fitting shaft portion 12 into the mounting hole 24, the outer diameter side engaging portion 25 and the inner diameter side engagement portion 16 are engaged with each other so as to be unable to rotate relative to each other. More specifically, the female spline teeth 27 of the outer diameter side engaging portion 25 and the male spline teeth 18 of the inner diameter side engaging portion 16 are engaged with a spline engagement. As a result, it is possible to rotate and drive the screw shaft 2 through the carrier 5.

In addition, by inserting the fitting shaft portion 12 into the mounting hole 24, the outer diameter side fitting surface portion 26 and the inner diameter side fitting surface portion 17 are fitted with a spigot fit. Thus, the degree of coaxiality between the screw shaft 2 and the carrier 5 is increased. The inner diameter side fitting surface portion 17 is press-fitted into the outer diameter side fitting surface portion 26, and thus the fitting shaft portion 12 is prevented from coming out from the mounting hole 24 toward the other side in the axial direction. However, by making the inner diameter of the outer diameter side fitting surface portion slightly larger than the outer diameter of the inner diameter side fitting surface portion, the outer diameter side fitting surface portion and the inner diameter side fitting surface portion can be fitted with a clearance fit having a small gap that is small enough not to allow looseness.

An inner ring raceway 28 of the rolling bearing 6 is directly formed at an intermediate portion in the axial direction (in the present example, the center portion in the axial direction) of the outer circumferential surface of the carrier 5. That is, the carrier 5 not only functions as a component of the planetary reduction mechanism 8 but also functions as an inner ring of the rolling bearing 6. In other words, it can be said that the carrier and the inner ring of the rolling bearing are integrally formed. In the present example, the rolling bearing 6 is configured by a deep groove ball bearing capable of supporting a radial load and an axial load in both directions, and thus the inner ring raceway 28 is configured by a deep groove having a concave arc shaped cross section.

In the present example, the portions of the outer circumferential surface of the carrier 5 that are separated from the inner ring raceway 28 on both sides in the axial direction are formed into a partially cylindrical surface shape. However, in order to make sliding contact with an inner diameter side end portion of a seal ring, which is an optional element for sealing the rolling bearing, it is also possible to form seal grooves over the entire circumference on both sides in the axial direction of the outer circumferential surface of the carrier.

The carrier 5 has support holes 29 for inserting and supporting pinion pins 41 of the planetary speed reduction mechanism 8 at a plurality of locations (three locations in this example) in the circumferential direction of an intermediate portion in the radial direction. The plurality of support holes 29 are arranged at equal intervals in the circumferential direction. In addition, the central axes of the plurality of support holes 29 are arranged parallel to each other. Each support hole 29 is configured by a through hole passing through the carrier 5 in the axial direction. That is, the support hole 29 is open not only on a side surface on the one side in the axial direction of the carrier 5, but also on a surface on the other side in the axial direction of the carrier 5. However, the support hole can also be configured as a bottomed hole that is open only on the side surface on the one side in the axial direction of the carrier.

An inner diameter of the support hole 29 is constant in the axial direction. In the present example, the diameter (inscribed circle diameter) of a virtual circle passing through an end portion on the inside in the radial direction of the plurality of support holes 29 is approximately the same as the outer diameter of the screw portion 11. In addition, the diameter of the virtual circle passing through the end portions of the plurality of support holes 29 (circumscribed circle diameter) is slightly smaller than the outer diameter of the portion of the nut 3 separated in the axial direction from the collar portion 21.

The carrier 5 has a protruding portion 30 in an intermediate portion in the radial direction of the side surface on the one side in the axial direction that includes the opening portions of the plurality of support holes 29, and the protruding portion 30 protrudes farther toward the one side in the axial direction than portions existing on the outer side in the radial direction and the inner side in the radial direction. The protruding portion 30 has an annular shape. The inner diameter of the protruding portion 30 is smaller than the diameter of a virtual cylindrical surface passing through the groove bottom portion of the shaft-side ball screw groove 13. The outer diameter of the protruding portion 30 is approximately the same as the outer diameter of a portion of the nut 3 that is separated in the axial direction from the collar portion 21, and is smaller than an outer diameter of the groove bottom portion of the inner ring raceway 28. A side surface (tip-end surface) on the one side in the axial direction of the protruding portion 30 is a flat surface that exists on a virtual plane orthogonal to the central axis of the carrier 5.

The protruding portion 30 and a portion of the side surface on the one side in the axial direction of the carrier 5 that exists on the outer side in the radial direction of the protruding portion 30 are connected by an outer diameter side connecting surface 31 that is inclined in a direction in which the outer diameter becomes larger while going toward the other side in the axial direction. In addition, the protruding portion 30 and a portion of the side surface on the one side in the axial direction of the carrier 5 that exists on the inner side in the radial direction of the protruding portion 30 are connected by an inner diameter side connecting surface 32 inclined in a direction in which the inner diameter becomes smaller while going toward the other side in the axial direction.

The side surface on the other side in the axial direction of the carrier 5 is a flat surface that exists on a virtual plane orthogonal to the central axis of the carrier 5.

The outer circumferential surface of the carrier 5 on which the inner ring raceway 28 is formed is subjected to an induction hardening process and a tempering process to form a heat-treated hardened layer. However, a heat-treated hardened layer is not formed on the side surface on the one side in the axial direction and the side surface on the other side in the axial direction of the carrier 5.

Rolling Bearing

The rolling bearing 6 supports the carrier 5 that is externally fitted onto the screw shaft 2 so as to be able to rotate with respect to the housing 22, and also supports a force in the axial direction transmitted to the carrier 5 by the housing 22. In the present example, the rolling bearing 6 is configured by a deep groove ball bearing capable of supporting a radial load and an axial load in both directions. However, multi-point contact ball bearings such as four-point contact ball bearings, double-row deep groove ball bearings, double-row angular contact ball bearings, conical rolling bearings, double-row tapered roller bearings, and the like, regardless of whether they are single or double row, can be used as rolling bearings, and any bearing capable of supporting radial and axial loads can be used.

The rolling bearing 6 includes an outer ring 33, the inner ring raceway 28, a plurality of rolling elements 34, and a cage 35.

The outer ring 33 has an annular shape and has an outer ring raceway 36 at a center portion in the axial direction of the inner circumferential surface. The outer ring 33 is internally fitted and fixed into the housing 22 and does not rotate during use. In the present example, the outer ring raceway 36 is configured by a deep groove having a concave arc-shaped cross section. Note that it is possible to provide a retaining ring that is locked to a portion of an inner circumferential surface of the housing 22 that is separated in the axial direction from a portion to which the outer ring 33 is internally fitted, and the retaining ring is also able to prevent the outer ring 33 from coming off.

In the present example, the portions of the inner circumferential surface of the outer ring 33 that are deviated from the outer ring raceway 36 on both sides in the axial direction are configured in a partially cylindrical shape. However, in order to lock the outer diameter side end portion of the seal ring, which is an optional element for sealing the rolling bearing, it is also possible to form locking grooves over the entire circumference in both side portions in the axial direction of the inner circumferential surface of the outer ring.

In the present example, the inner ring raceway 28 of the rolling bearing 6 is formed directly at an intermediate portion in the axial direction of the outer circumferential surface of the carrier 5 that faces the outer ring raceway 36 in the radial direction, and the inner ring is omitted.

The plurality of rolling elements 34 are made of steel or ceramic, and are arranged between the outer ring raceway 36 and the inner ring raceway 28 at equal intervals in the circumferential direction. In the present example, balls are used as the rolling elements 34.

The cage 35 has an annular shape and has pockets 37 equally spaced in the circumferential direction. Rolling elements 34 are rotatably held inside the pockets 37.

Planetary Reduction Mechanism

In the present example, a planetary reduction mechanism 8 is used to transmit the rotation of the electric motor 7 to the screw shaft 2 of the ball screw device 1. The planetary reduction mechanism 8 includes a sun gear 38, a plurality of planetary gears 39, a ring gear 40, a carrier 5, and pinion pins 41.

The sun gear 38 is fixed to the tip-end portion of a motor shaft (sun gear shaft) 42 of the electric motor 7. The ring gear 40 is arranged coaxially with the sun gear 38 and is internally fitted and fixed into the housing 22. Note that the housing 22 can be split into two parts, and a portion into which the ring gear 40 is fitted and a portion into which the outer ring 33 of the rolling bearing 6 is fitted may be configured by separate members.

A plurality of (three in the present example) planetary gears 39 are arranged at equal intervals in the circumferential direction and are rotatably supported by the carrier 5. More specifically, a half portion on the other side in the axial direction of the pinion pin 41 is press-fitted into the support hole 29 formed in the carrier 5, and a half portion on the one side in the axial direction of the pinion pin 41 is made to protrude in the axial direction from the support hole 29. The planetary gear 39 is rotatably supported around a half portion on the one side in the axial direction of the pinion pin 41 through a slide bearing or a needle bearing (C&R) (not illustrated).

Note that the method of fixing the pinion pin to the support hole is not particularly limited, and a fixing structure using crimping, a locking pin, or the like may also be adopted. In addition, it is also possible to adopt a construction in which the pinion pins are supported on both sides by supporting end portions on the one side in the axial direction of the pinion pins by a second carrier having an annular shape (not illustrated). Moreover, the number of planetary gears is not limited to three, but may be two, or four or more.

The planetary gears 39 engage with both the sun gear 38 and the ring gear 40.

Explanation of Operation of Ball Screw Device

The ball screw device 1 of the present example causes the nut 3 to move linearly by rotationally driving the screw shaft 2 through the planetary reduction mechanism 8 by an electric motor 7 serving as a drive source. More specifically, when the electric motor 7 is energized and the sun gear 38 is rotated in a predetermined direction, the planetary gears 39 revolve around the sun gear 38 while rotating. The nut 3 is caused to move linearly by the revolution motion of the planetary gears 39 being transmitted to the screw shaft 2 through the carrier 5, and the screw shaft 2 being rotationally driven in a predetermined direction. For example, in a case where the sun gear 38 is rotationally driven toward one side in the circumferential direction, the nut 3 moves toward the one side in the axial direction relative to the screw shaft 2, and in a case where the sun gear 38 is rotationally driven toward the other side in the circumferential direction, the nut 3 moves to the other side in the axial direction with respect to the screw shaft 2.

With the ball screw device 1 of the present example, the screw shaft 2 can be rotationally driven through the planetary reduction mechanism 8 by the electric motor 7 serving as the drive source. Note that the stroke end related to the relative movement of the nut 3 to the one side in the axial direction and to the other side in the axial direction with respect to the screw shaft 2 can be regulated using various conventionally known stroke limiting mechanisms.

In the ball screw device 1 of the present example, despite using construction in which the screw shaft 2 is rotationally driven using the planetary reduction mechanism 8, the number of parts may be reduced and ease of assembly may be improved.

Figure 15:
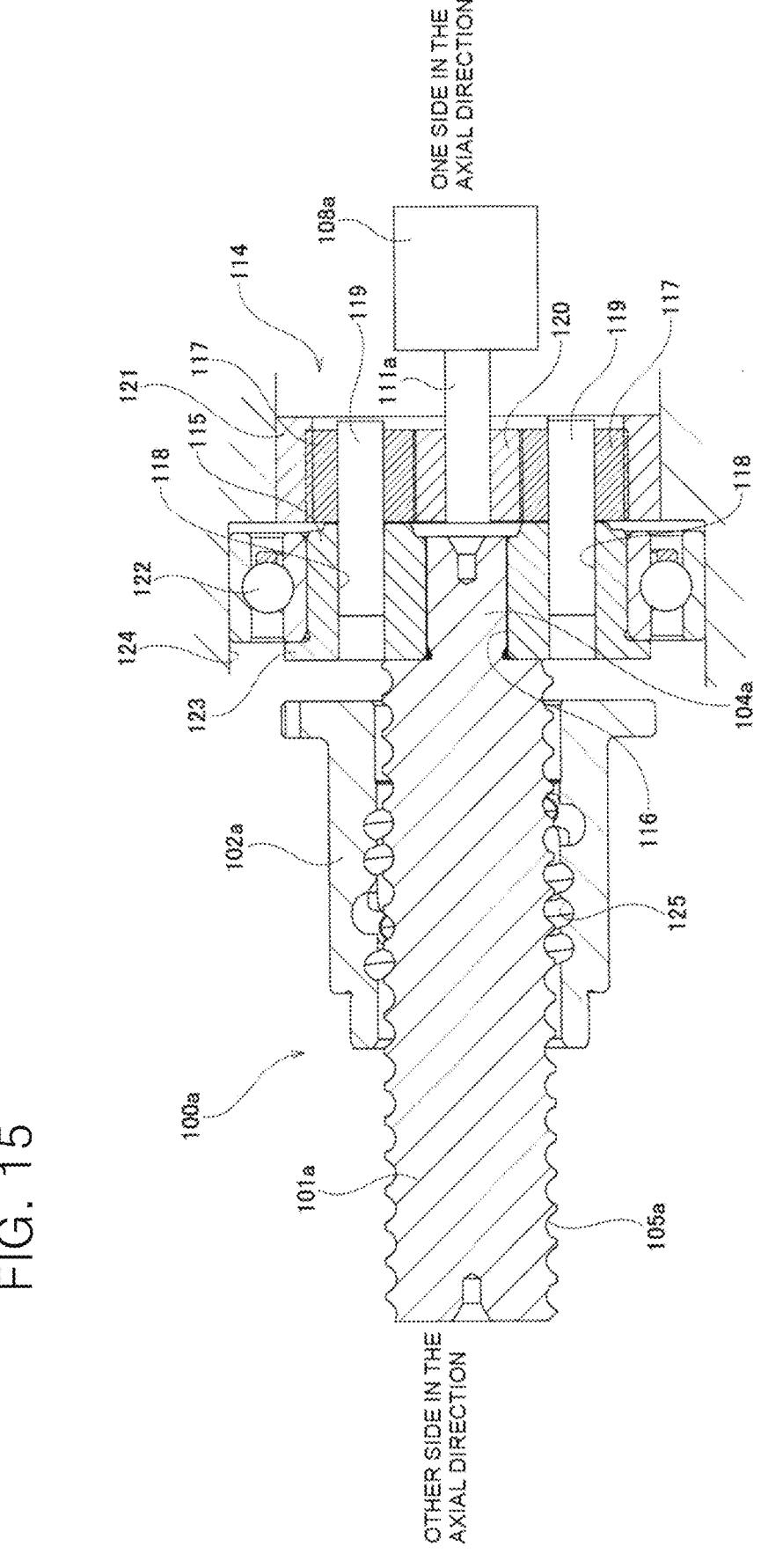
FIG. 15 is a cross-sectional view illustrating a ball screw device having undisclosed construction in which a ball screw device and a planetary reduction mechanism are combined.

That is, in the present example, the inner ring raceway 28 of the rolling bearing 6 is directly formed on the outer circumferential surface of the carrier 5, and thus the inner ring of the rolling bearing 6 may be omitted. Therefore, compared with the construction illustrated in FIG. 15 in which an inner ring separate from the carrier is externally fitted and fixed to the carrier, the number of parts and assembly man-hours may be reduced, and the ease of assembly may be improved. In addition, in the present example, there is no need to form a collar portion for transmitting force in the axial direction on the outer circumferential surface of the carrier 5, and the number of processing steps may be reduced accordingly. Furthermore, in the present example, the carrier 5 does not require a collar portion, and thus it is sufficient to form a heat-treated hardened layer only on the outer circumferential surface including the inner ring raceway 28. Therefore, when performing a hole drilling process to form the support holes 29 on side surfaces in the axial direction of the carrier 5, there is no need to perform a removal process to remove the heat-treated hardened layer, and the number of processing steps can be reduced accordingly.

In the present example, in a state in which the fitting shaft portion 12 of the screw shaft 2 is inserted into the mounting hole 24 of the carrier 5, the inner diameter side fitting surface portion 17 having a cylindrical outer circumferential surface formed on the fitting shaft portion 12, and the outer diameter side fitting surface portion 26 having a cylindrical inner circumferential surface formed in the mounting hole 24 of the carrier 5 are fitted with a spigot fit, and thus the degree of coaxiality between the screw shaft 2 and the carrier 5 may be increased. In addition, the inner diameter side fitting surface portion 17 is press-fitted into the outer diameter side fitting surface portion 26, and thus the fitting section between the inner diameter side fitting surface portion 17 and the outer diameter side fitting surface portion 26 may also prevent the fitting shaft portion 12 from coming out from the mounting hole 24 toward the other side in the axial direction.

In the present invention, by providing the outer diameter side fitting surface portion 26 at a portion on the other side in the axial direction of the inner circumferential surface of the mounting hole 24, the portion where the outer diameter side fitting surface portion 26 and the inner diameter side fitting surface portion 17 are fitted with a spigot fit, and the portions where the pinion pins 41 are press-fitted into the support holes 29 may be prevented from overlapping in the radial direction. In other words, it is possible to offset the positions in the axial direction of the portion where the outer diameter side fitting surface portion 26 and the inner diameter side fitting surface portion 17 are fitted with a spigot fit, and the portions where the pinion pins 41 are press-fitted into the support holes 29.

Therefore, even in a case where the diameter is expanded (material is moved outward in the radial direction) in a portion of the carrier 5 that exists around the outer diameter side fitting surface portion 26 as the inner diameter side fitting surface portion 17 is press-fitted into the outer diameter side fitting surface portion 26, an influence on the change in the inner diameters of portions on the one side in the axial direction of the support holes 29 into which the pinion pins 41 are press-fitted may be reduced. Moreover, even in a case where the diameter is reduced (material is moved radially inward) in a portion of the carrier 5 that is exists on inner sides in the radial direction of portions on the one side in the axial direction of the support holes 29 as the pinion pins 41 are press-fitted into portions on the one side in the axial direction of the support holes 29, an influence on the change in the inner diameter of the outer diameter side fitting surface portion 26 may be reduced.

In the present example, a side surface on the one side in the axial direction forms the flat-surface shaped protruding portion 30 in an intermediate portion in the radial direction of the side surface on the one side in the axial direction of the carrier 5 that includes the opening portions of the support holes 29. Therefore, the planetary gears 39 can be prevented from moving to the other side in the axial direction by using the side surface on the one side in the axial direction of the protruding portion 30. In addition, even in a case where the end surface on the other side in the axial direction of the planetary gear 39 comes into sliding contact with the side surface on the one side in the axial direction of the protruding portion 30, it is possible to prevent the sliding resistance from becoming excessive. Note that in the present example, the side surface on the other side in the axial direction of the planetary gear 39 and the side surface on the one side in the axial direction of the protruding portion 30 are in direct contact; however, another member such as a sliding washer may be interposed between the side surface on the other side in the axial direction of the planetary gear 39 and the side surface on the one side in the axial direction of the protruding portion 30.

In the present example, the carrier 5 is rotatably supported by the housing 22 using a rolling bearing 6, and thus axial force transmitted to the carrier 5 can be supported by the housing 22 through the rolling bearing 6. More specifically, when the screw shaft 2 is rotationally driven, the reaction force in the axial direction that acts on the screw shaft 2 from the nut 3 through the balls 4 can be prevented from being transmitted to the engagement section between the planetary gears 39 and the sun gear 38 and the engagement section between planetary gears 39 and the ring gear 40. In addition, even in a case where a force in the axial direction acts on the carrier 5 due to the use of helical gears as the planetary gears 39 for reasons such as ensuring sound vibration performance, the rolling bearing 6 is provided, and thus it is possible to prevent such axial force from being transmitted to rolling contact sections between the balls and the shaft-side ball screw groove 13 and the nut-side ball screw groove 20.

Second Example

Figure 3:
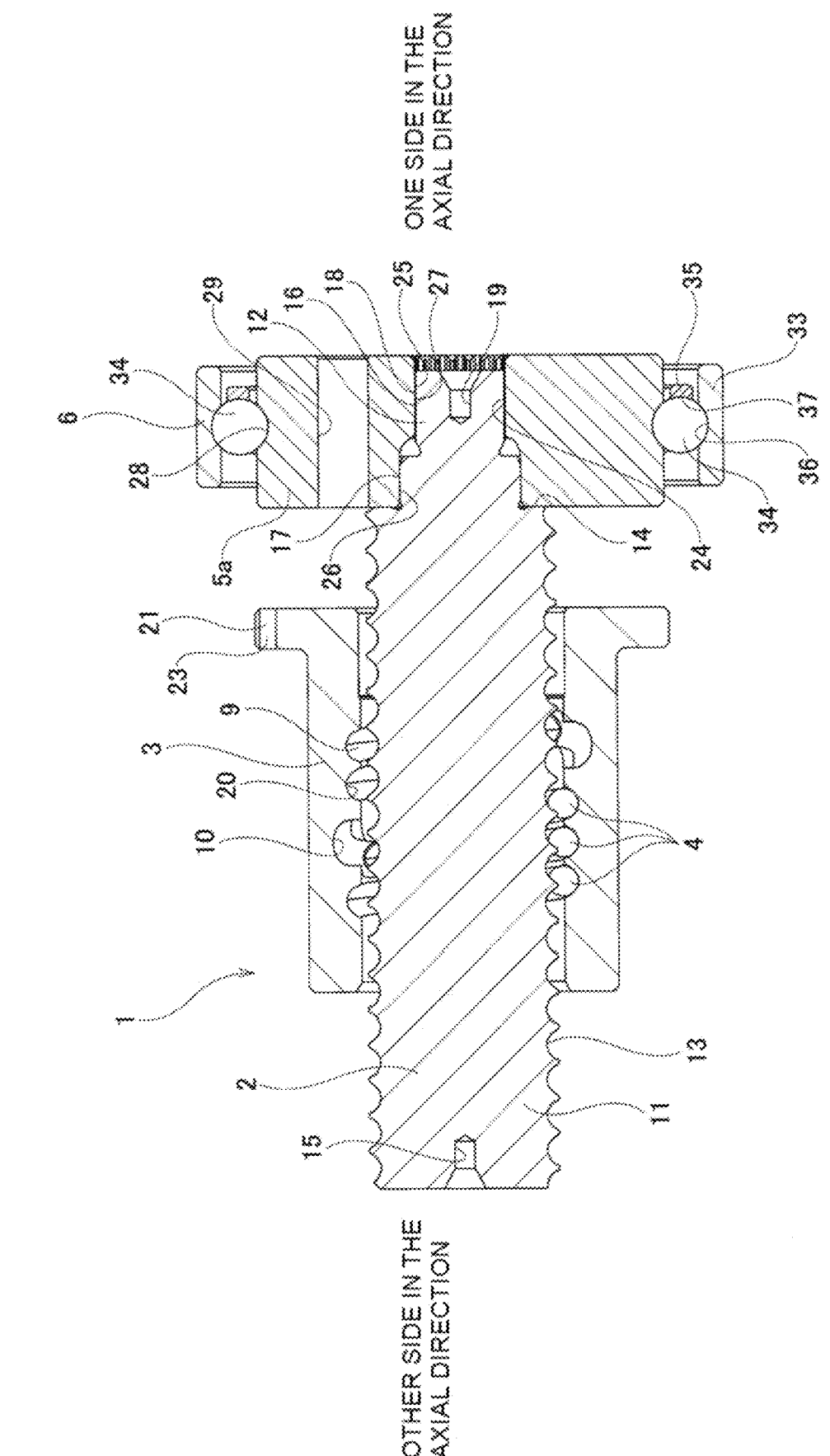
FIG. 3 is a diagram corresponding to FIG. 2, illustrating a ball screw device of a second example of an embodiment according to the present disclosure.

FIG. 3 illustrates a ball screw device 1 of a second example of an embodiment according to the present disclosure.

In the present example, the protruding portion 30 (see FIG. 2, etc.) that the carrier 5 was provided with in the construction of the first example is not provided on the side surface on the one side in the axial direction of the carrier 5a. The side surface on the one side in the axial direction of the carrier 5a is configured by a flat surface existing on a virtual plane orthogonal to the central axis of the carrier 5a.

In the present example, the width dimension in the axial direction of the carrier 5a can be shortened. Therefore, the ball screw device 1 may be made smaller. The other configurations and effects are the same as in the first example.

Third Example

Figure 4:
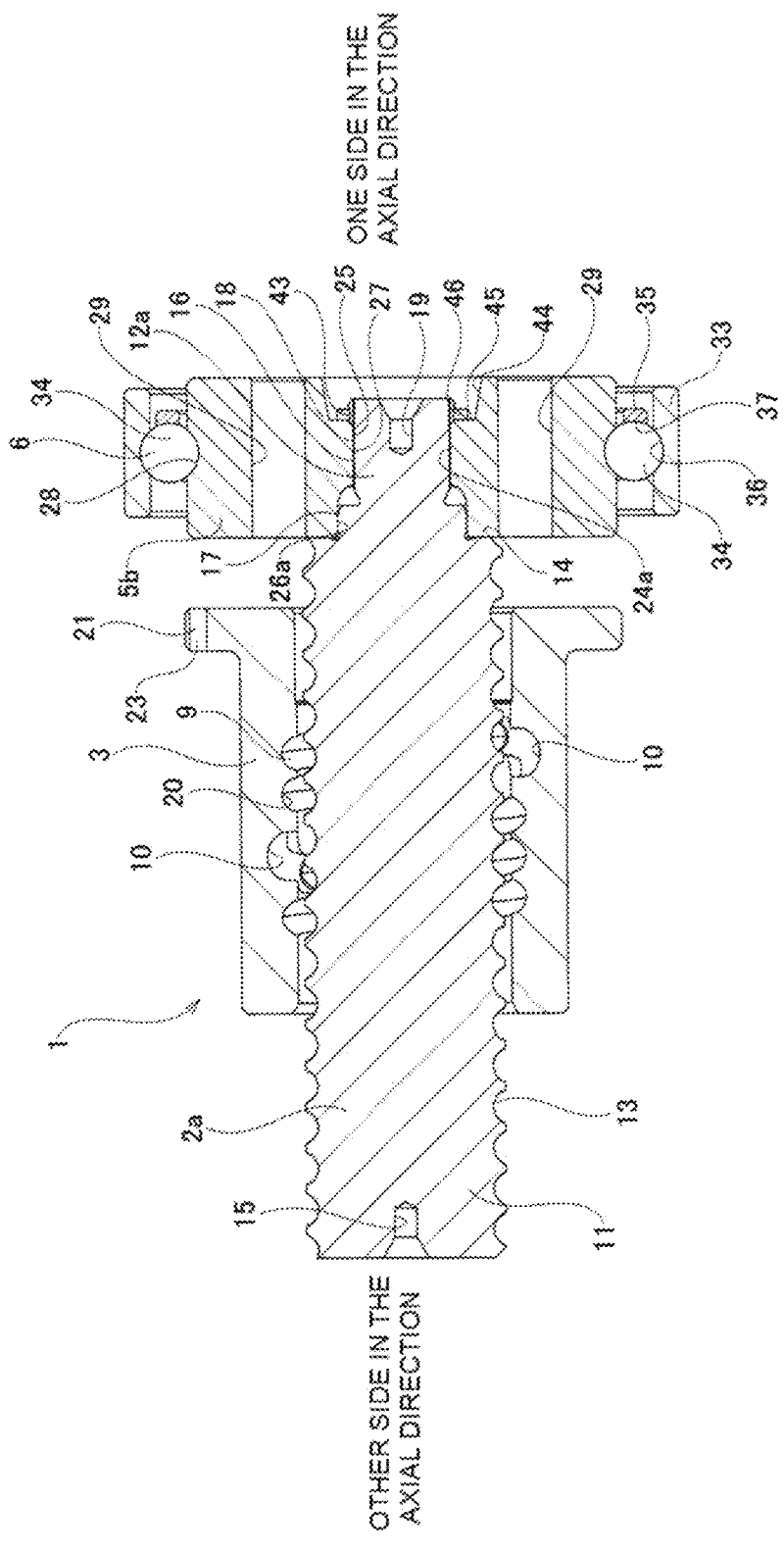
FIG. 4 is a diagram corresponding to FIG. 2, illustrating a ball screw device of a third example of an embodiment according to the present disclosure.
Figure 5:
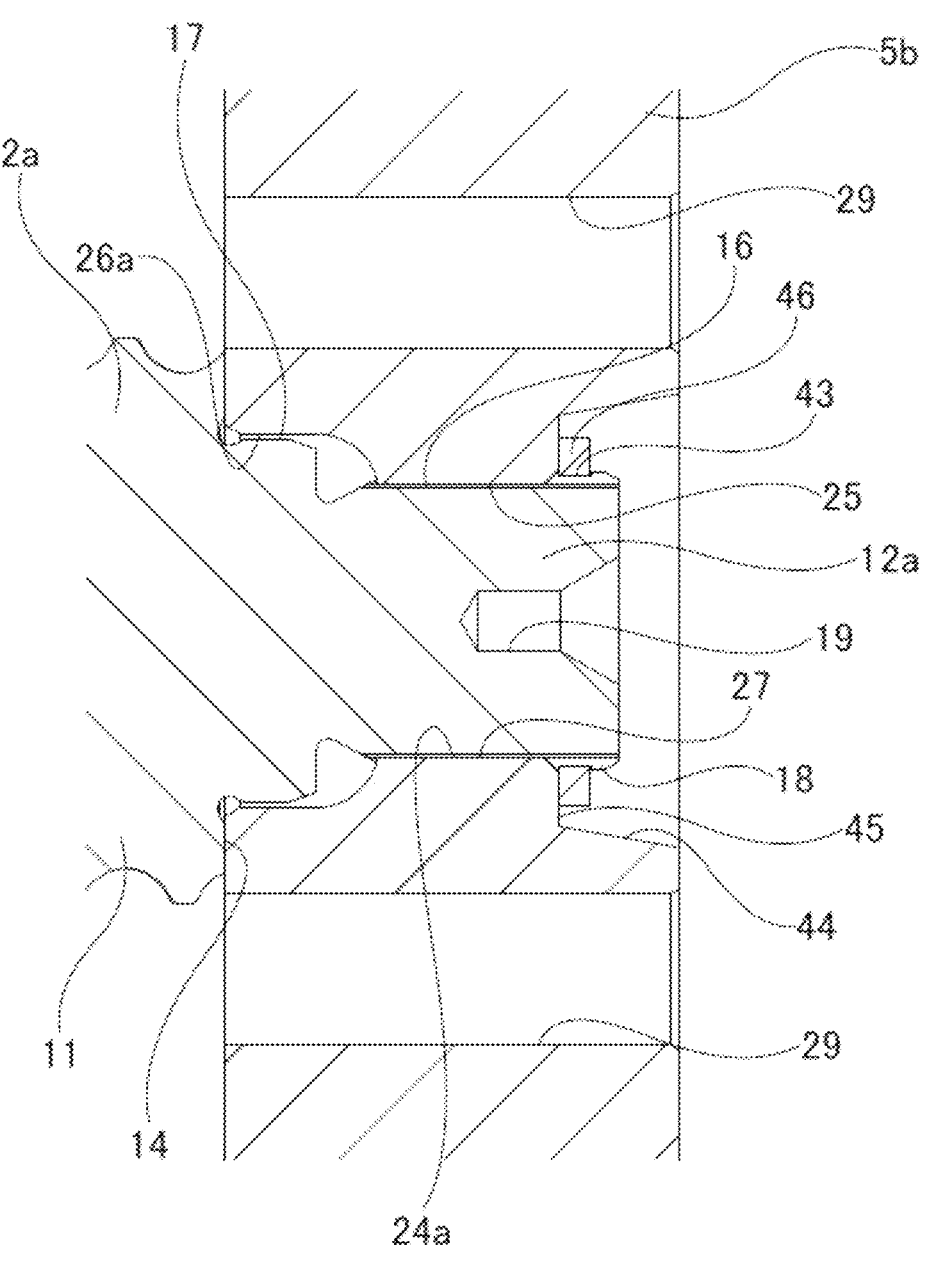
FIG. 5 is a partially enlarged view of FIG. 4.

FIGS. 4 and 5 illustrate a ball screw device 1 of a third example of an embodiment according to the present disclosure.

In the present example, a locking groove 43 is formed in a part in the axial direction of the outer circumferential surface of a fitting shaft portion 12a of the screw shaft 2a. More specifically, the locking groove 43 is arranged over the entire circumference at an end portion on the one side in the axial direction of the inner diameter side engaging portion 16 of the fitting shaft portion 12a.

In addition, an outer diameter side engaging portion 25, an outer diameter side fitting surface portion 26a, a large diameter portion 44, and a step surface 45 are provided on the inner circumferential surface of a mounting hole 24a of the carrier 5b.

The outer diameter side engaging portion 25 is provided at an intermediate portion in the axial direction of the inner circumferential surface of the mounting hole 24a, and has female spline teeth 27 over the entire circumference. In the present example, the dimension in the axial direction of the outer diameter engaging portion 25 is made shorter than the dimension in the axial direction of the inner diameter side engaging portion 16 provided on the outer circumferential surface of the fitting shaft portion 12a. In a state in which the fitting shaft part 12a of the screw shaft 2a is inserted inside the mounting hole 24a of the carrier 5b, and the abutment surface 14 of the screw portion 11 abutting against the side surface on the other side in the axial direction of the carrier 5b, an end portion on the one side in the axial direction of the inner diameter side engaging portion 16 (a portion in which the locking groove 43 is formed) is made to protrude from the outer diameter side engaging portion 25 toward the one side in the axial direction.

The outer diameter side fitting surface portion 26a is provided on the other side in the axial direction of the inner circumferential surface of the mounting hole 24a. The inner diameter of the outer diameter side fitting surface portion 26a is larger than the root diameter of the female spline teeth 27 of the outer diameter side engaging portion 25, and is slightly larger than the outer diameter of the inner diameter side fitting surface portion 17 of the outer circumferential surface of the fitting shaft portion 12a.

In the present example as well, by fitting the outer diameter side fitting surface portion 26a and the inner diameter side fitting surface portion 17 with a spigot fit in a state in which the fitting shaft portion 12a is inserted into the mounting hole 24a, the coaxiality between the screw shaft 2a and the carrier 5b is improved. However, in the present example, the outer diameter side fitting surface portion 26a and the inner diameter side fitting surface portion 17 are fitted with a clearance fit with a gap small enough to not allow looseness. By the fitting section between the outer diameter side fitting surface portion 26a and the inner diameter side fitting surface portion 17, it is not possible to prevent the fitting shaft portion 12a from coming out from the mounting hole 24a toward the other side in the axial direction. Therefore, in the present example, a locking ring 46 is provided.

A large diameter portion 44 is provided on the one side in the axial direction of the inner circumferential surface of the mounting hole 24a. The inner diameter of the large diameter portion 44 is larger than the inner diameter of the outer diameter side fitting surface portion 26a and larger than the outer diameter of the locking ring 46 in the free state thereof. The large diameter portion 44 is a conical cylindrical surface whose inner diameter increases while going toward the one side in the axial direction (opening side).

The step surface 45 is arranged between the outer diameter side engaging portion 25 and the large diameter portion 44, and radially connects an end portion on the one side in the axial direction of the outer diameter engaging portion 25 and an end portion on the other side in the axial direction of the large diameter portion 44. The step surface 45 is a flat surface existing on a virtual plane perpendicular to the central axis of the carrier 5, and has a circular ring shape.

In the present example, the fitting shaft portion 12a is inserted inside the mounting hole 24a, and in a state in which the abutting surface 14 of the screw portion 11 abuts against the side surface on the other side in the axial direction of the carrier 5b, the locking ring 46 is locked in the locking groove 43 formed in the outer circumferential surface of the fitting shaft portion 12a. Moreover, the side surface on the other side in the axial direction of the locking ring 46 abuts against the step surface 45. This prevents the fitting shaft portion 12a from coming out from the mounting hole 24a toward the other side in the axial direction. The locking ring 46 has a C-shape and has a discontinuous portion in a part in the circumferential direction. The operation of locking the locking ring 46 to the locking groove 43 can be easily performed from a space on the one side in the axial direction of the screw shaft 2a using a pliers tool or the like.

As a modification of the present example, it is possible to employ a configuration in which a locking ring is provided so as to span between an outer diameter side locking groove formed on an inner peripheral surface of the mounting hole and an inner diameter side locking groove formed on the outer circumferential surface of the fitting shaft portion. In this case, it is also possible to employ a configuration in which the locking ring is locked to the inner circumferential surface of the mounting hole (outer diameter side locking groove) in advance, and by elastically expanding and then elastically contracting (restoring) the locking ring as the fitting shaft portion is inserted inside the mounting hole, the inner diameter side portion of the locking ring is locked in the inner diameter locking groove formed on the outer circumferential surface of the fitting shaft portion. Alternatively, it is also possible to employ a configuration in which the locking ring is locked to the outer circumferential surface of the fitting shaft portion (inner diameter side locking groove) in advance, and by elastically expanding and then elastically contracting (restoring) the locking ring as the fitting shaft portion is inserted inside the mounting hole, the outer diameter side portion of the locking ring is locked in the outer diameter side locking groove formed on the inner circumferential surface of the mounting hole.

In the present example, since the outer diameter side fitting surface portion 26a and the inner diameter side fitting surface portion 17 are fitted with a clearance fit, it is possible to easily perform the work of inserting the fitting shaft portion 12a inside the mounting hole 24a. In addition, the locking ring 46 that is engaged with the outer circumferential surface of the fitting shaft portion 12a can effectively prevent the fitting shaft portion 12a from coming out from the mounting hole 24a toward the other side in the axial direction. However, by press-fitting the inner diameter side fitting surface portion into the outer diameter side fitting surface portion and locking the locking ring to the outer circumferential surface of the fitting shaft portion or to the inner circumference surface of the mounting hole, it is also possible to prevent the fitting shaft portion from coming out from the mounting hole toward the other side in the axial direction. The other configurations and effects are the same as in the first and second examples.

Fourth Example

Figure 6:
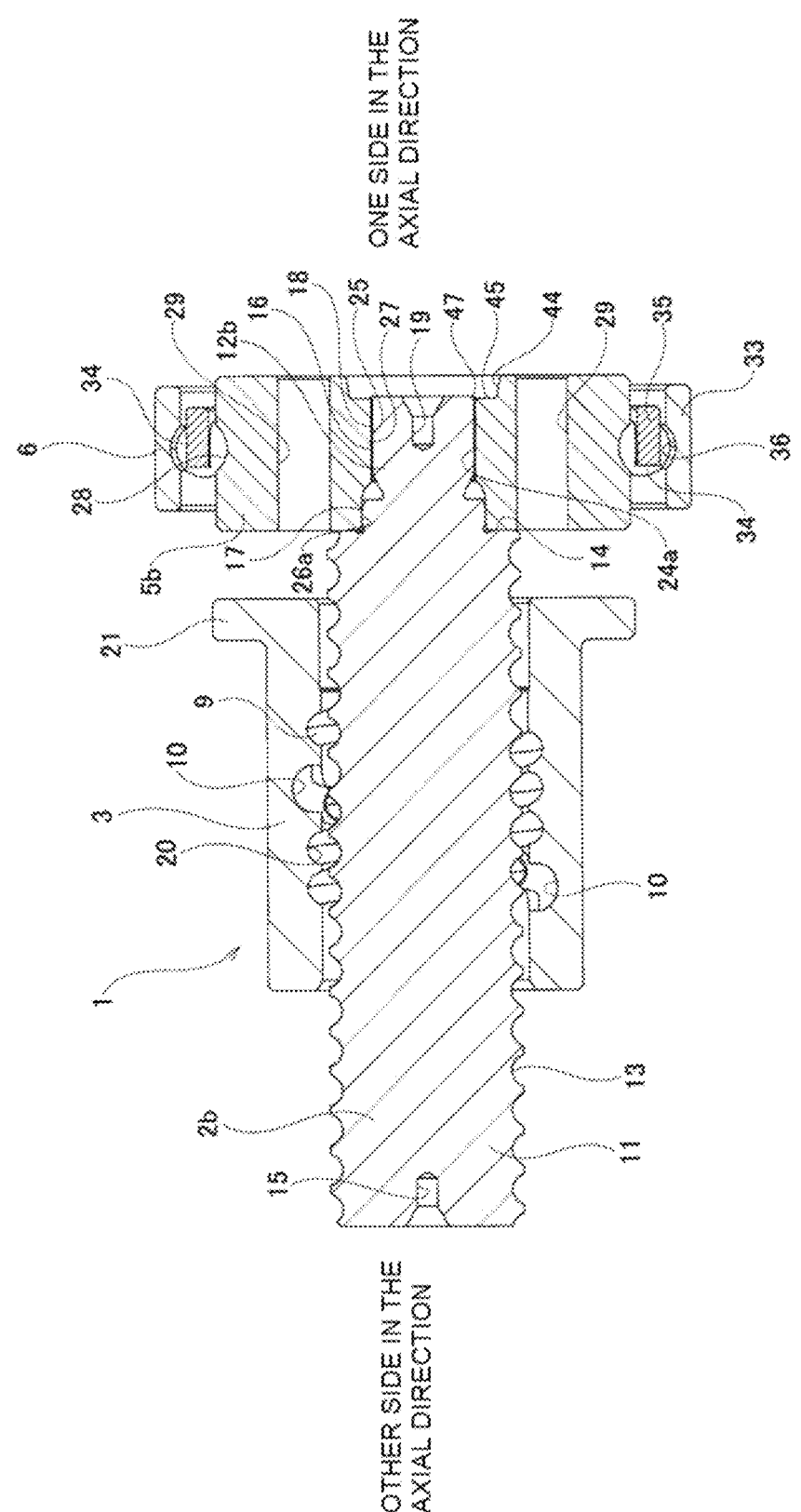
FIG. 6 is a diagram corresponding to FIG. 2, illustrating a ball screw device of a fourth example of an embodiment according to the present disclosure.
Figure 7:
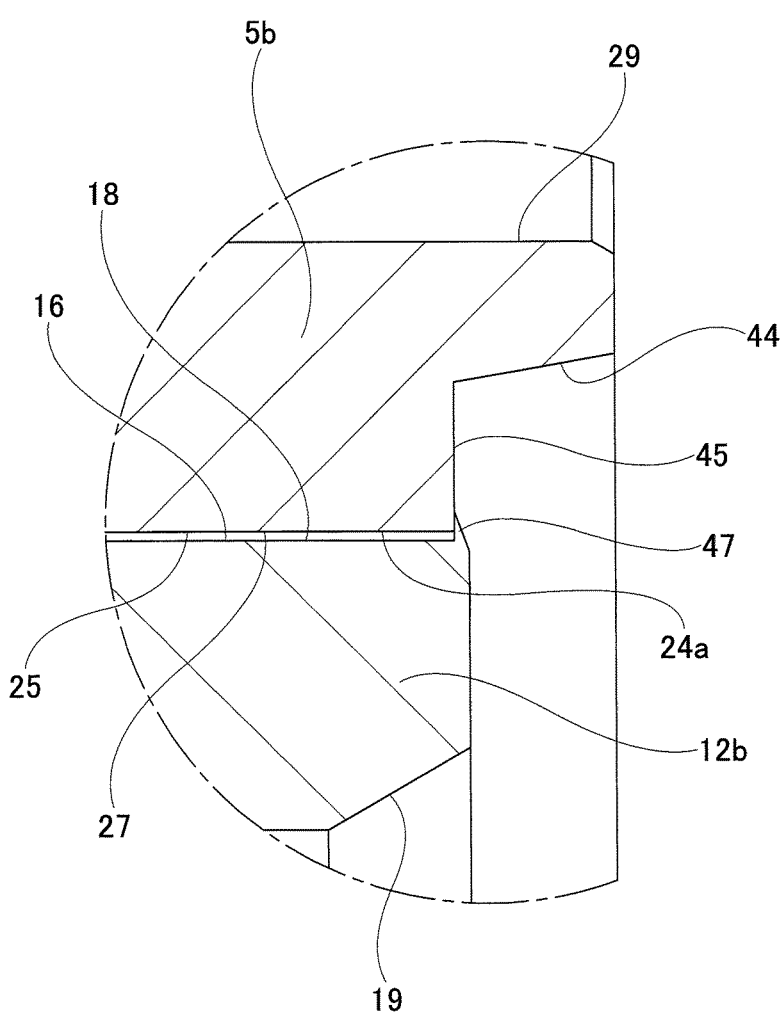
FIG. 7 is a partially enlarged view of FIG. 6.
Figure 8:
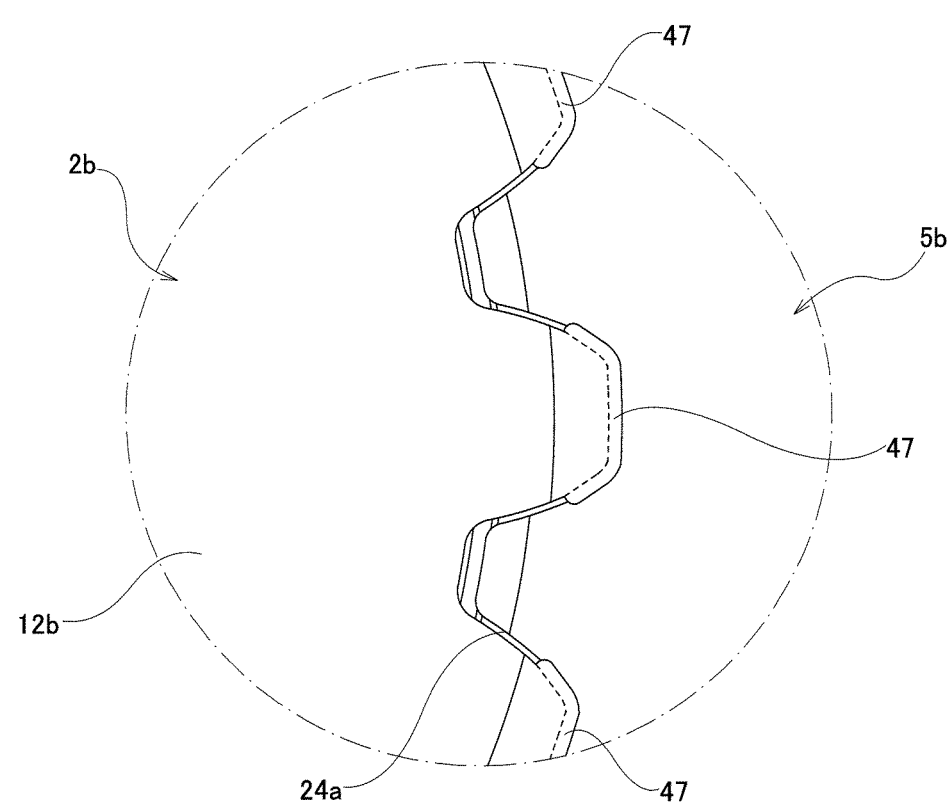
FIG. 8 is a partially enlarged end view of a fitting section between a fitting shaft portion of a screw shaft and a mounting hole of a carrier, viewed from one side in the axial direction, in a ball screw device of the fourth example.

FIGS. 6 to 8 illustrate a ball screw device 1 of a fourth example of an embodiment according to the present disclosure.

In the present example as well, similar to the construction of the third example, an outer diameter side engaging portion 25, an outer diameter side fitting surface portion 26a, a large diameter portion 44, and a step surface 45 are provided on the inner circumferential surface of the mounting hole 24a. The basic construction of the mounting hole 24a in the present example is the same as the construction in the third example.

In the present example as well, the outer diameter side fitting surface portion 26a and the inner diameter side fitting surface portion 17 are fitted with a clearance fit with a small gap that does not allow looseness, and thus by the fitting section between the outer diameter side fitting surface portion 26a and the inner diameter side fitting surface portion 17, it is not possible to prevent the fitting shaft portion 12b from coming out from the mounting hole 24a toward the other side in the axial direction. For this reason, in the present example, a crimped portion 47 is provided.

In the present example, in a state in which the fitting shaft portion 12b is inserted inside the mounting hole 24a, and the abutment surface 14 of the screw portion 11 is abutted against the side surface on the other side in the axial direction of the carrier 5b, the crimped portion 47 is formed on an outer circumferential edge portion of the end portion on the one side in the axial direction of the fitting shaft portion 12b (inner diameter side engaging portion 16) using a jig (not shown). Then, the crimped portion 47 is pressed against the step surface 45. This prevents the fitting shaft portion 12b from coming out from the mounting hole 24a toward the other side in the axial direction.

In the present example, since the outer diameter side fitting surface portion 26a and the inner diameter side fitting surface portion 17 are fitted with a clearance fit, it is possible to easily perform the work of inserting the fitting shaft portion 12b inside the mounting hole 24a. In addition, the crimped portion 47 formed on the outer circumferential surface of the fitting shaft portion 12b can effectively prevent the fitting shaft portion 12b from coming out from the mounting hole 24a toward the other side in the axial direction. Moreover, in order to prevent the fitting shaft portion 12b from coming out, it is not necessary to form a locking groove on the outer circumferential surface of the fitting shaft portion 12b, and the locking ring is also not necessary. However, by forming a crimped portion on the outer circumferential surface of the fitting shaft portion and locking the locking ring on the outer circumferential surface of the fitting shaft portion or to the inner circumferential surface of the mounting hole, it is also possible to prevent the fitting shaft portion from coming out from the mounting hole toward the other side in the axial direction. The other configurations and effects are the same as in the first, second, and third examples.

Fifth Example

Figure 9:
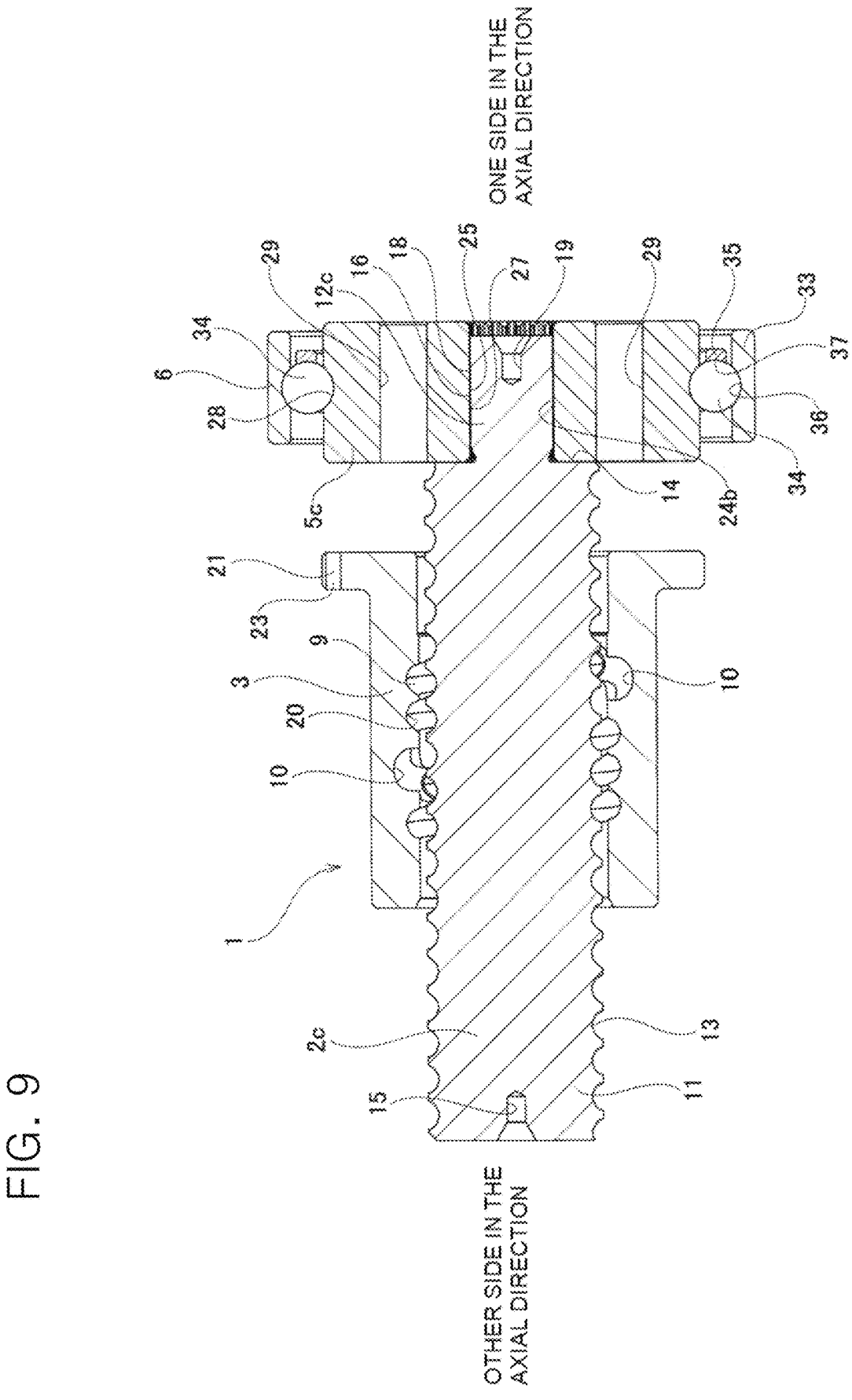
FIG. 9 is a diagram corresponding to FIG. 2, illustrating a ball screw device of a fifth example of an embodiment according to the present disclosure.

FIG. 9 illustrates a ball screw device 1 of a fifth example of an embodiment according to the present disclosure.

In the present example, the shape of the outer circumferential surface of the fitting shaft portion 12c of the screw shaft 2c and the shape of the inner circumferential surface of the mounting hole 24b of the carrier 5c are different from the construction of the first to fourth examples.

In the present example, the inner diameter side engaging portion 16 is formed on the entire outer circumferential surface of the fitting shaft portion 12c, and the cylindrical inner diameter side fitting surface portion is omitted from the fitting shaft portion 12c. In addition, the outer diameter side engaging portion 25 is formed entirely on the inner circumferential surface of the mounting hole 24c, and the cylindrical outer diameter side fitting surface portion is omitted from the mounting hole 24b.

In the present example, by processing the male spline teeth 18 of the inner diameter side engaging portion 16 of the screw shaft 2c with reference to the outer diameter surface of the screw shaft 2c, the coaxiality of the tooth tip surface (outer diameter surface) or the tooth surface (side surface) with respect to the screw shaft 2c is increased. Moreover, by processing the female spline teeth 27 of the outer diameter side engaging portion 25 of the carrier 5c with reference to the outer diameter surface of the carrier 5c, the coaxiality of the tooth bottom surface (outer diameter surface) or tooth surface (side surface) of the female spline teeth 27 with respect to the carrier 5c is increased. Thus, when externally fitting the carrier 5c to the fitting shaft portion 12c of the screw shaft 2c, it is possible to employ outer diameter surface matching (large diameter matching) in which the tooth tip surfaces of the male spline teeth 18 and the tooth bottom surfaces (large diameter surfaces) of the female spline teeth 27 are brought into pressure contact, or tooth surface matching in which the tooth surfaces (side surfaces) of the male spline teeth 18 and the tooth surfaces (side surfaces) of the female spline teeth 27 are brought into pressure contact with each other as a fit between the inner diameter side engaging portion 16 and the outer diameter side engaging portion 25. Therefore, in the present example as well, it is possible to ensure a high degree of coaxiality between the screw shaft 2c and the carrier 5c. Note that, in a case where tooth surface matching is employed, the accuracy of the tooth surfaces of the male spline teeth 18 and the tooth surfaces of the female spline teeth 27 affects the coaxiality, and thus it is preferable to adopt outer diameter surface matching.

In the present example, the dimension in the axial direction of the engaging section (spline engagement portion) between the inner diameter side engaging portion 16 and the outer diameter side engaging portion 25 can be made longer than in the construction of the first to fourth examples. Therefore, torque that can be transmitted from the carrier 5c to the screw shaft 2c can be increased. In addition, in the present example, in a case where tooth surface matching is employed as the fit between the inner diameter side engaging portion 16 and the outer diameter side engaging portion 25, the pressure contact between the tooth surfaces of the male spline teeth 18 and the tooth surfaces of the female spline teeth 27 can prevent the carrier 5c from coming out from the fitting shaft portion 12c toward the one side in the axial direction, and in a case where outer diameter surface matching is employed, the pressure contact between the tooth tip surfaces of the male spline teeth 18 and the bottom surfaces of the female spline teeth 27 can prevent the carrier 5c from coming out from the fitting shaft portion 12c toward the one side in the axial direction. The other configurations and effects are the same as in the first and second examples.

Sixth Example

Figure 10:
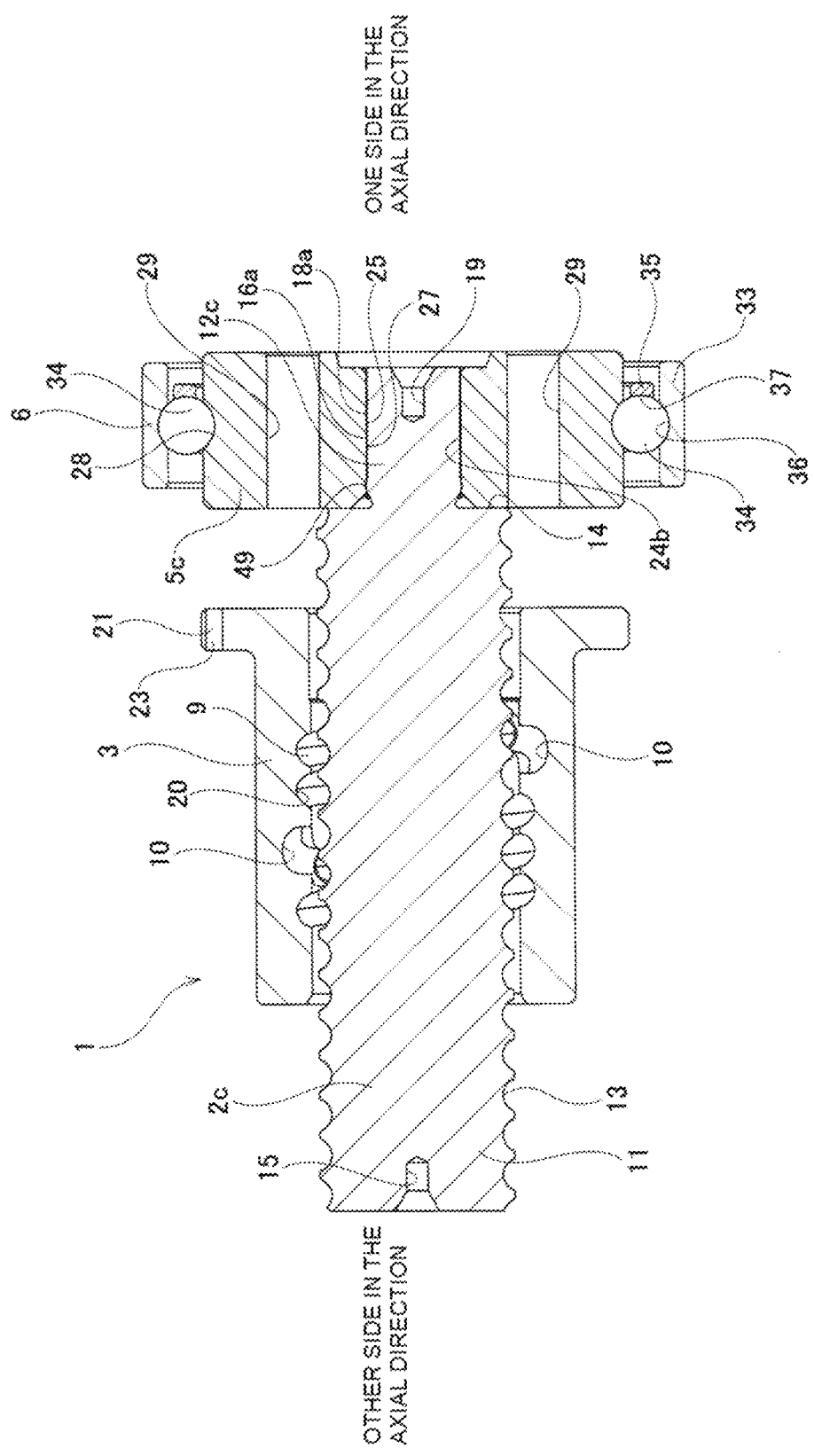
FIG. 10 is a diagram corresponding to FIG. 2, illustrating a ball screw device of a sixth example of an embodiment according to the present disclosure.
Figure 11:
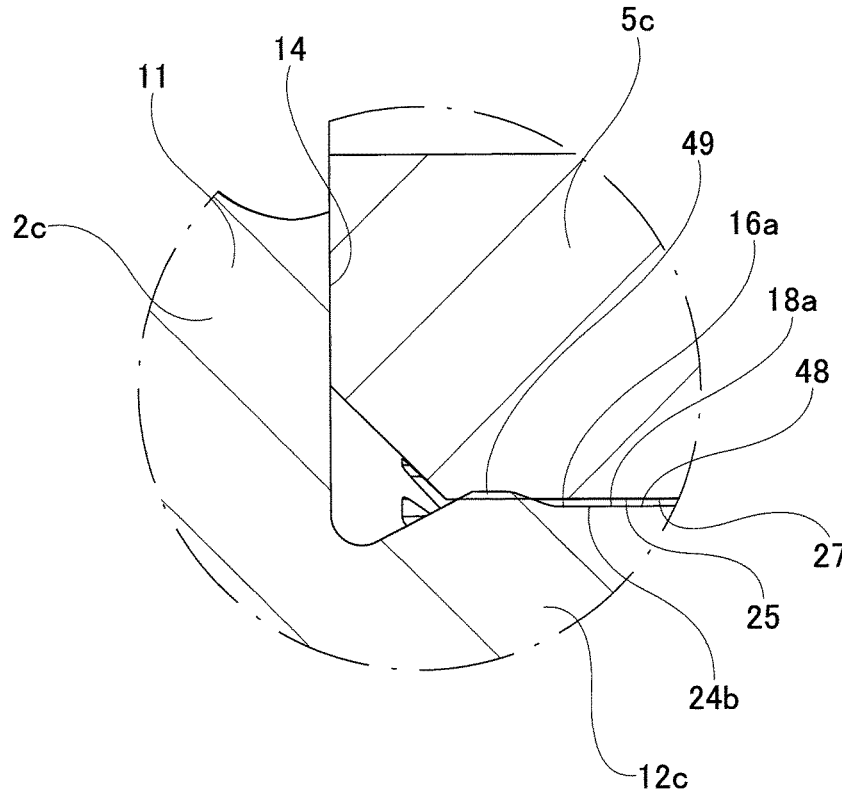
FIG. 11 is a partially enlarged view of FIG. 10.
Figure 12:
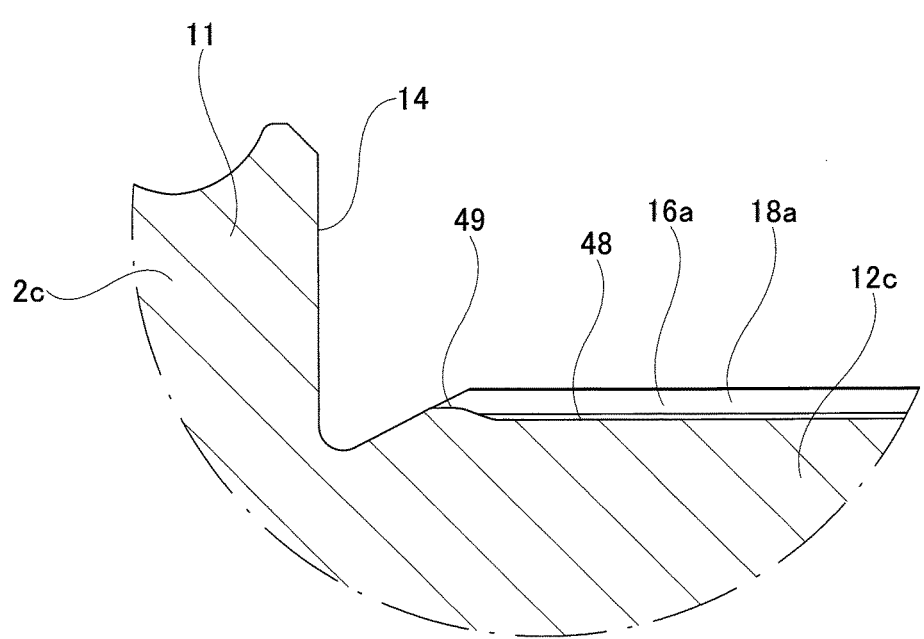
FIG. 12 is an enlarged cross-sectional view of the fitting shaft portion illustrated in FIG. 11 with the carrier omitted.

FIGS. 10 to 12 illustrate a ball screw device 1 of a sixth example of an embodiment according to the present disclosure.

The present example is a modification of the fifth example. In the case of the present example as well, the inner diameter side engaging portion 16a is formed entirely on the outer circumferential surface of the fitting shaft portion 12c, and the outer diameter side engaging portion 25 is formed entirely on the inner circumferential surface of the mounting hole 24b.

In the present example, the engagement section between the inner diameter side engaging portion 16a and the outer diameter side engaging portion 17a has an interference in the radial direction in a portion in the axial direction. In order for this, the root diameter of the male spline teeth 18a of the inner diameter side engaging portion 16a is not constant in the axial direction. More specifically, the root diameter of the male spline tooth 18a from the end portion on the one side in the axial direction to a portion near the end portion on the other side in the axial direction is made slightly smaller than the tip circle diameter of the female spline teeth 27 of the outer diameter side engaging portion 25, and the root diameter of the male spline teeth 18a at the end portion on the other side in the axial direction is slightly larger than the tip circle diameter of the female spline teeth 27. In order for this, a protruding portion 49 that protrudes slightly outward in the radial direction is provided at the end portion on the other side in the axial direction of the tooth root portion 48 of the male spline teeth 18a.

In the present example, in a state in which the fitting shaft part 12c is inserted into the mounting hole 24b, and the inner diameter side engaging portion 16a and the outer diameter side engaging portion 25 are engaged with a spline engagement, it is possible to provide an interference in the radial direction between the tooth tip surface of the female spline teeth 27 and the protruding portion 49 provided on the tooth root portion 48 of the male spline teeth 18a. Therefore, in the present example, it is possible to provide an interference in the radial direction at the end portion on the other side in the axial direction of the spline engagement section between the inner diameter side engaging portion 16a and the outer diameter side engaging portion 25. In other words, the end portion on the other side in the axial direction of the inner diameter side engaging portion 16a can be press-fitted into the end portion on the other side in the axial direction of the outer diameter side engaging portion 25. Note that in the present example as well, similar to the fifth example, when the carrier 5c is externally fitted onto the fitting shaft portion 12c of the screw shaft 2c, a high degree of coaxiality between the screw shaft 2c and the carrier 5c can be ensured by employing outer diameter surface matching or tooth surface matching as a fit between the inner diameter side engaging portion 16a and the outer diameter side engaging portion 25.

As a modification of the present example, the root diameter of the male spline teeth is constant in the axial direction, and a protruding portion that protrudes inward in the radial direction may also be provided on a part in the axial direction of the groove bottom portion of the female spline teeth (for example, the end portion on the one side in the axial direction). In addition, protruding portions may be provided on both the groove bottom portions of the male spline teeth and the groove bottom portions of the female spline teeth. Furthermore, protruding portions may be provided on the tooth tip surfaces of the male spline teeth and/or the female spline teeth instead of on the groove bottom portions of the male spline teeth and the female spline teeth. Moreover, the inner diameter side engaging portion and the outer diameter side engaging portion are not limited to spline teeth, and other construction such as serration teeth can also be employed.

In the present example, an interference in the radial direction is provided in a part in the axial direction of the engagement section between the inner diameter side engaging portion 16a and the outer diameter side engaging portion 25, and thus it is possible to prevent the fitting shaft portion 12c from coming out from the mounting hole 24b toward the other side in the axial direction. The other configurations and effects are the same as in the first, second, and fifth examples.

Seventh Example

Figure 13:
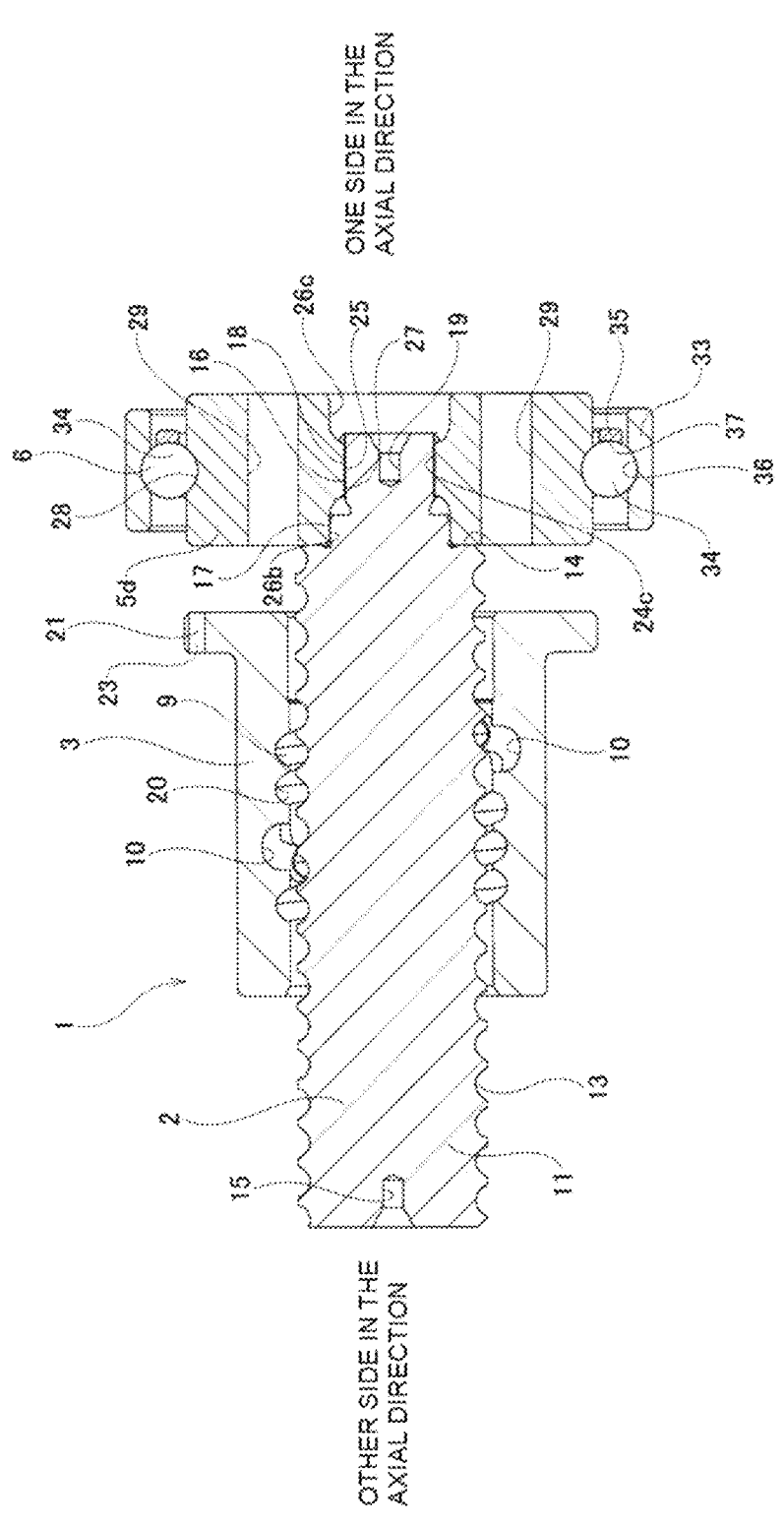
FIG. 13 is a diagram corresponding to FIG. 2, illustrating a ball screw device of a seventh example of an embodiment according to the present disclosure.
Figure 14:
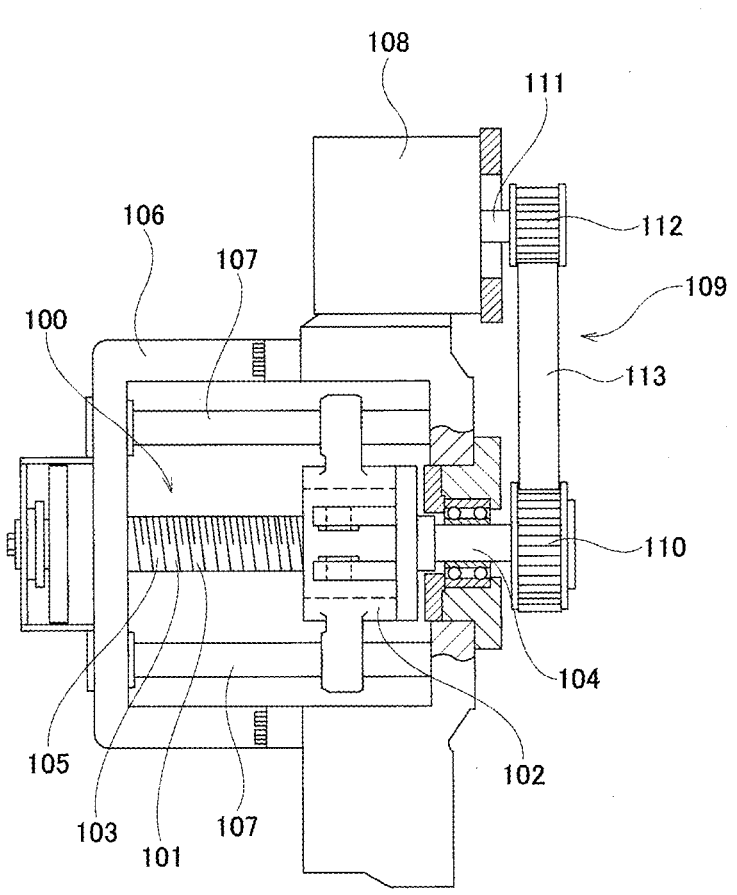
FIG. 14 is a cross-sectional view illustrating a ball screw device having known construction in which a ball screw device and a pulley device are combined.

FIG. 13 illustrates a ball screw device 1 of a seventh example of an embodiment according to the present disclosure.

In the present example, the carrier 5d has a symmetrical shape with respect to the axial direction entirely. For this reason, the outer diameter side engaging portion 25 and a pair of outer diameter side fitting surface portions 26b, 26c are provided on the inner circumferential surface of the mounting hole 24c of the carrier 5d.

The outer diameter side engaging portion 25 is provided at an intermediate portion in the axial direction of the inner circumferential surface of the mounting hole 24c. The pair of outer diameter side fitting surface portions 26b, 26c are provided on both sides in the axial direction of the outer diameter engaging portion 25 on the inner circumferential surface of the mounting hole 24c.

In the present example, directionality in the axial direction of the carrier 5d can be eliminated, and thus the work efficiency of assembling the carrier 5d to the screw shaft 2 can be improved. Therefore, the ease of assembling the ball screw device 1 can be further improved. The other configurations and effects are the same as in the first and second examples.

Embodiments according to the present disclosure have been described above; however, the embodiments according to the present disclosure are not limited thereto and can be modified as appropriate without departing from the technical idea thereof. In addition, the construction of the embodiments according to the present disclosure can be combined as appropriate, as long as no contradiction occurs.

In each of the embodiments according to the present disclosure, construction is employed in which male spline teeth are provided on the outer circumferential surface of the fitting shaft portion of the screw shaft, and the inner circumferential surface of the carrier is configured with a mounting hole having female spline teeth, and the carrier is spline-fitted to the fitting shaft portion. However, according to the present disclosure, the construction for fixing the carrier to the fitting shaft portion is not particularly limited. For example, it is possible to employ construction in which the fitting shaft portion has an oval cross-sectional shape and a width across flats shape (stadium shape) with a pair of flat outer surfaces parallel to each other on the outer peripheral surface, the mounting hole of the carrier has an oval cross-sectional shape and a width across flats shape (stadium shape) with a pair of flat inner surfaces parallel to each other on the inner circumferential surface, and the carrier is fit to the fitting shaft portion with a non-circular fit.

In each of the embodiments according to the present disclosure, construction is described in which the circulation groove is directly formed on the inner circumferential surface of the nut; however, it is also possible to form the circulation groove in a circulation part (for example, a piece) separate from the nut, and to fix the circulation part to the nut.

REFERENCE SIGNS LIST

1 Ball screw device
2, 2a, 2b Screw shaft
3 Nut

4 Ball
5, 5a, 5b, 5c, 5d Carrier
6 Rolling Bearing
7 Electric motor
8 Planetary reduction mechanism
9 Load path
10 Circulation groove
11 Screw portion
12, 12a, 12b, 12c Fitting shaft portion
13 Shaft-side ball screw groove
14 Abutment surface
15 First center hole
16, 16a Inner diameter side engaging portion
17 Inner diameter side fitting surface portion
18, 18a Male spline teeth
19 Second center hole
20 Nut-side ball screw groove
21 Collar portion
22 Housing
23 Engaging groove
24, 24a, 24b, 24c Mounting hole
25 Outer diameter side engaging portion
26, 26a, 26b, 26c Outer diameter side fitting surface portion
27 Female spline teeth
28 Inner ring raceway
29 Support hole
30 Protruding portion
31 Outer diameter side connecting surface
32 Inner diameter side connecting surface
33 Outer ring
34 Rolling element
35 Cage
36 Outer ring raceway
37 Pocket
38 Sun gear
39 Planetary gear
40 Ring gear
41 Pinion pin
42 Motor shaft
43 Locking groove
44 Large diameter portion
45 Step surface
46 Locking ring
47 Crimped portion
48 Tooth root portion
49 Protruding portion
100, 100a Ball screw device
101, 101a Screw shaft
102, 102a Nut
103 Screw portion
104, 104a Fitting shaft portion
105, 105a Shaft-side ball screw groove
106 Housing
107 Guide rod
108 Electric motor
109 Pulley device
110 Driven pulley
111 Motor shaft
112 Drive pulley
113 Belt
114 Planetary reduction mechanism
115 Carrier
116 Mounting hole
117 Planetary gear
118 Support hole
119 Pinion pin 120 Sun gear
121 Ring gear
122 Rolling Bearing
123 Collar portion
124 Housing
125 Nut-side ball screw groove

The invention claimed is:

1. A ball screw device comprising:
a screw shaft including a screw portion having a spiral-shaped shaft-side ball screw groove on an outer circumferential surface thereof, and a fitting shaft portion arranged on one side in an axial direction of the screw portion, and configured to rotate when in use;
a nut including a spiral-shaped nut-side ball screw groove on an inner circumferential surface thereof and configured to move linearly when in use;
a plurality of balls arranged between the shaft-side ball screw groove and the nut-side ball screw groove;
a carrier constituting a planetary reduction mechanism, fixed in a relatively unrotatable manner to the fitting shaft portion and configured to rotationally drive the screw shaft; and
a rolling bearing having an outer ring with an outer ring raceway on an inner circumferential surface thereof, an inner ring raceway provided in a portion facing the outer ring raceway in a radial direction, and a plurality of rolling elements rotatably arranged between the outer ring raceway and the inner ring raceway, and configured to rotatably support the carrier; wherein
the fitting shaft portion has an inner diameter side engaging portion on an outer circumferential surface thereof;
the carrier has a mounting hole in a center portion in the radial direction into which the fitting shaft portion can be inserted;
the mounting hole has an outer diameter side engaging portion on an inner circumferential surface thereof that engages with the inner diameter side engaging portion such that relative rotation is not possible; and
the inner ring raceway is directly formed on an outer circumferential surface of the carrier, wherein
the fitting shaft portion has an inner diameter side fitting surface portion on a portion of the outer circumferential surface that is separated in the axial direction from the inner diameter side engaging portion, and
the mounting hole has an outer diameter side fitting surface portion on a portion of an inner circumferential surface thereof that is separated in the axial direction from the outer diameter side engaging portion, and the outer diameter side fitting surface portion fits with the inner diameter side fitting surface portion with a spigot fit,
wherein the inner diameter side fitting surface portion and the outer diameter side fitting surface portion are fitted with a clearance fit with a minute gap, and
wherein a locking ring is locked to the outer circumferential surface of the fitting shaft portion or the inner circumferential surface of the mounting hole, and the locking ring prevents the fitting shaft portion from coming out of the mounting hole in the axial direction.

2. A ball screw device comprising:
a screw shaft including a screw portion having a spiral-shaped shaft-side ball screw groove on an outer circumferential surface thereof, and a fitting shaft portion arranged on one side in an axial direction of the screw portion, and configured to rotate when in use;

a nut including a spiral-shaped nut-side ball screw groove on an inner circumferential surface thereof and configured to move linearly when in use;

a plurality of balls arranged between the shaft-side ball screw groove and the nut-side ball screw groove;

a carrier constituting a planetary reduction mechanism, fixed in a relatively unrotatable manner to the fitting shaft portion and configured to rotationally drive the screw shaft; and a rolling bearing having an outer ring with an outer ring raceway on an inner circumferential surface thereof, an inner ring raceway provided in a portion facing the outer ring raceway in a radial direction, and a plurality of rolling elements rotatably arranged between the outer ring raceway and the inner ring raceway, and configured to rotatably support the carrier; wherein the fitting shaft portion has an inner diameter side engaging portion on an outer circumferential surface thereof;

the carrier has a mounting hole in a center portion in the radial direction into which the fitting shaft portion can be inserted;

the mounting hole has an outer diameter side engaging portion on an inner circumferential surface thereof that engages with the inner diameter side engaging portion such that relative rotation is not possible; and the inner ring raceway is directly formed on an outer circumferential surface of the carrier, wherein the fitting shaft portion has an inner diameter side fitting surface portion on a portion of the outer circumferential surface that is separated in the axial direction from the inner diameter side engaging portion, and the mounting hole has an outer diameter side fitting surface portion on a portion of an inner circumferential surface thereof that is separated in the axial direction from the outer diameter side engaging portion, and the outer diameter side fitting surface portion fits with the inner diameter side fitting surface portion with a spigot fit, wherein the inner diameter side fitting surface portion and the outer diameter side fitting surface portion are fitted with a clearance fit with a minute gap, and wherein a crimped portion is formed on the outer circumferential surface of the fitting shaft portion, and the crimped portion prevents the fitting shaft portion from coming out of the mounting hole in the axial direction.

3. A ball screw device comprising:

a screw shaft including a screw portion having a spiral-shaped shaft-side ball screw groove on an outer circumferential surface thereof, and a fitting shaft portion arranged on one side in an axial direction of the screw portion, and configured to rotate when in use;

a nut including a spiral-shaped nut-side ball screw groove on an inner circumferential surface thereof and configured to move linearly when in use;

a plurality of balls arranged between the shaft-side ball screw groove and the nut-side ball screw groove;

a carrier constituting a planetary reduction mechanism, fixed in a relatively unrotatable manner to the fitting shaft portion and configured to rotationally drive the screw shaft; and a rolling bearing having an outer ring with an outer ring raceway on an inner circumferential surface thereof, an inner ring raceway provided in a portion facing the outer ring raceway in a radial direction, and a plurality of rolling elements rotatably arranged between the outer ring raceway and the inner ring raceway, and configured to rotatably support the carrier;

the fitting shaft portion having an inner diameter side engaging portion on an outer circumferential surface thereof;

the carrier having a mounting hole in a center portion in the radial direction into which the fitting shaft portion can be inserted;

the mounting hole having an outer diameter side engaging portion on an inner circumferential surface thereof that engages with the inner diameter side engaging portion such that relative rotation is not possible; and the inner ring raceway directly formed on an outer circumferential surface of the carrier, wherein the carrier has support holes at a plurality of locations in the circumferential direction of an intermediate portion in the radial direction for inserting and supporting pinion pins of the planetary reduction mechanism, and the support holes are through holes that pass through the carrier in the axial direction, and wherein the carrier has a protruding portion extending toward the one side in the axial direction in a portion including openings of the support holes on the one side in the axial direction.

4. The ball screw device according to claim 3, wherein the protruding portion has an annular shape.

* * * * *